(12) United States Patent
Chien

(10) Patent No.: US 9,894,685 B2
(45) Date of Patent: Feb. 13, 2018

(54) LICENSED ASSISTED ACCESS NETWORK SYSTEM

(71) Applicant: Institute For Information Industry, Taipei (TW)

(72) Inventor: Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/007,195

(22) Filed: Jan. 26, 2016

(65) Prior Publication Data

US 2016/0219623 A1 Jul. 28, 2016

Related U.S. Application Data

(60) Provisional application No. 62/109,017, filed on Jan. 28, 2015.

(51) Int. Cl.
| | |
|---|---|
| *H04W 72/00* | (2009.01) |
| *H04W 74/08* | (2009.01) |
| *H04W 16/14* | (2009.01) |
| *H04W 72/04* | (2009.01) |

(52) U.S. Cl.
CPC ....... *H04W 74/0808* (2013.01); *H04W 16/14* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2015/0023315 A1 | 1/2015 | Yerramalli et al. | |
| 2015/0250002 A1* | 9/2015 | Sun | H04W 74/0808 370/329 |
| 2016/0050004 A1* | 2/2016 | Mallik | H04B 7/0626 370/329 |
| 2016/0119951 A1* | 4/2016 | Mallik | H04L 5/001 370/329 |

* cited by examiner

*Primary Examiner* — Suhail Khan
(74) *Attorney, Agent, or Firm* — Skaar Ulbrich Macari, P.A.

(57) ABSTRACT

A licensed assisted access network system is provided. The licensed assisted access network system includes a mobile station and a first base station. The mobile station determines a use status of an unlicensed band and generates first available unlicensed channel group information. The mobile station transmits the first available unlicensed channel group information to the first base station. The first base station selects a first unlicensed channel according to the first available unlicensed channel group information. The first base station initializes a communication schedule assessment procedure with the mobile station through the first unlicensed channel.

11 Claims, 23 Drawing Sheets

LICENSED ASSISTED ACCESS NETWORK SYSTEM

PRIORITY

This application claims priority to U.S. Provisional Patent Application No. 62/109,017 filed on Jan. 28, 2015, which is hereby incorporated by reference in its entirety.

FIELD

The present invention relates to a licensed assisted access network system. More particularly, in the licensed assisted access network architecture of the present invention, a mobile station assists a base station in communication scheduling.

BACKGROUND

In conventional $3^{rd}$ Generation Partnership Project (3GPP) networks, telecommunication operators transmit data mainly through respective licensed bands; however, the efficiency of this kind of data transmission is limited by the bandwidth of the licensed bands. Accordingly, the licensed assisted access (LAA) technology has thus been developed.

Specifically, the LAA technology mainly uses licensed bands to transmit control messages and uses unlicensed bands to assist in transmitting network data. In this way, by using the unlicensed bands, the network data transmission efficiency can be effectively improved. The unlicensed band selection and the communication scheduling of the data transmission are all dominated by the base station; however, this technology has a drawback that the network resource use efficiency is low.

In detail, in the communication scheduling of the LAA technology, communication interference to the mobile station may be formed in a contention region when different base stations select a same unlicensed band. On the other hand, when different base stations select different unlicensed bands, the network resource cannot be reused in a contention free region. Furthermore, because the base station needs to be responsible for the band selection and the Listen Before Talk (LBT) procedure of all mobile stations, the load of the base station will become a bottleneck in performance as the number of the mobile stations increases.

Accordingly, an urgent need exists in the art to overcome the drawbacks of the aforesaid conventional LAA technology, improve the network resource use efficiency and meanwhile reduce the load of the base station.

SUMMARY

An objective of the present invention is to provide a licensed assisted access (LAA) network system. The disclosure includes an LAA network system comprising a mobile station and a first base station. In the LAA network system: (a) the mobile station determines a use status of an unlicensed band and generates first available unlicensed channel group information; (b) the mobile station transmits the first available unlicensed channel group information to the first base station; (c) the first base station selects a first unlicensed channel according to the first available unlicensed channel group information; and (d) the first base station initializes a communication schedule assessment procedure with the mobile station via the first unlicensed channel.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific example, embodiment, environment, applications or implementations described in these example embodiments. Therefore, description of these example embodiments is only for purpose of illustration rather than to limit the present invention. In the following embodiments and the attached drawings, elements unrelated to the present invention are omitted from depiction; and dimensional relationships among individual elements in the attached drawings are illustrated only for ease of understanding, but not to limit the actual scale.

Figure 1A:
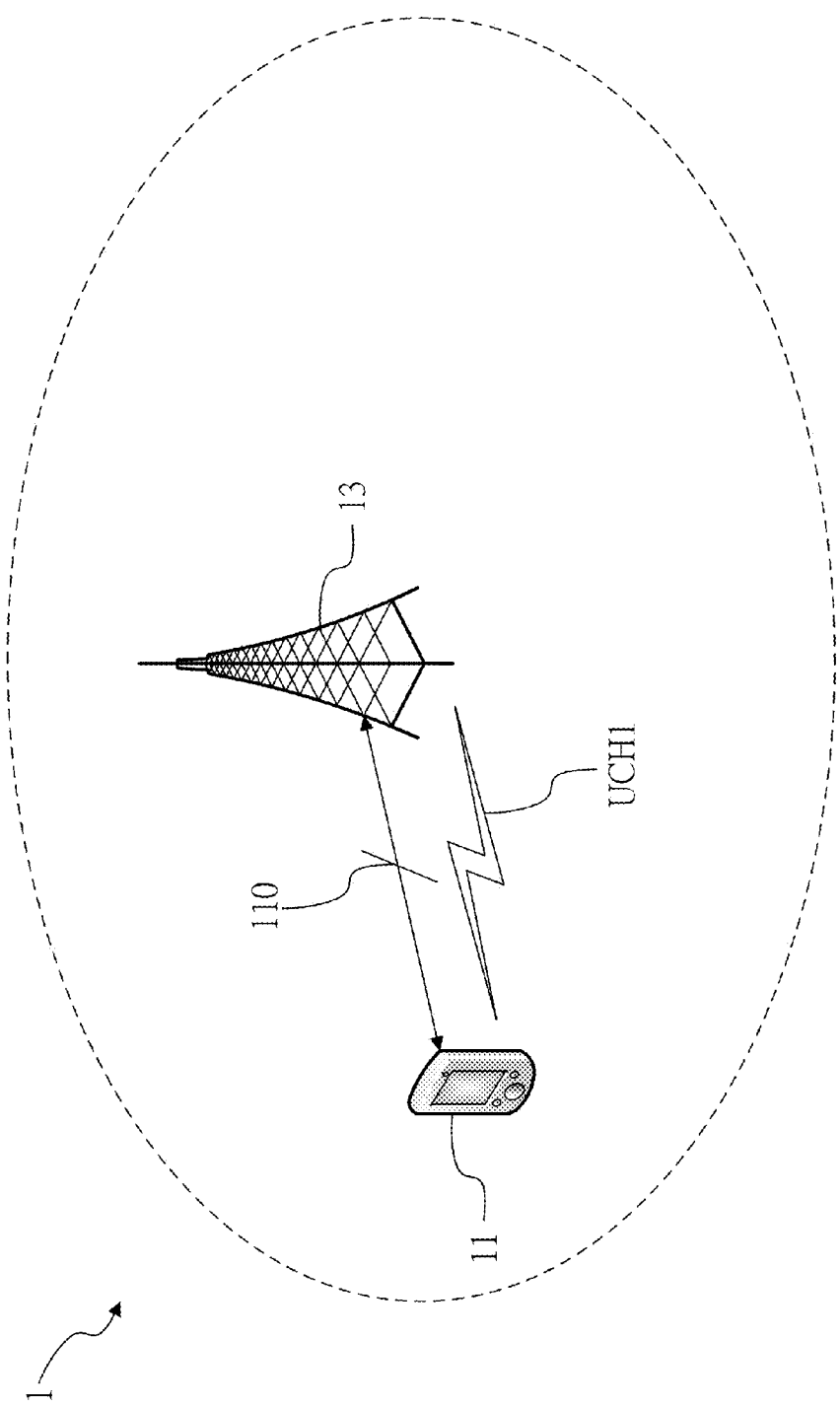
FIG. 1A is a schematic view of an LAA network system according to a first embodiment of the present invention.
Figure 1B:
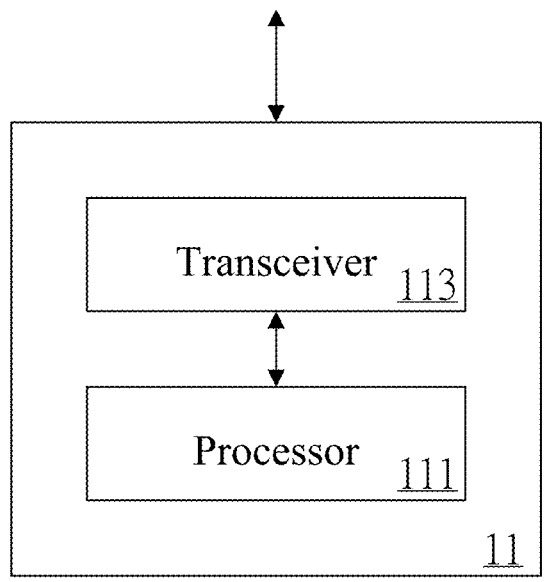
FIG. 1B is a block diagram of a mobile station according to the first embodiment of the present invention.
Figure 1C:
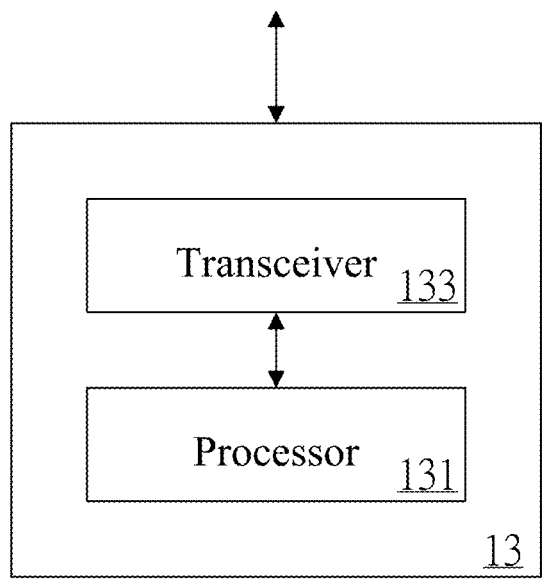
FIG. 1C is a block diagram of a first base station according to the first embodiment of the present invention.

Please refer to FIG. 1A to FIG. 1C together, and FIG. 1A is a schematic view of a licensed assisted access (LAA) network system 1 according to a first embodiment of the present invention. The LAA network system 1 comprises a mobile station 11 and a first base station 13. FIG. 1B is a block diagram of the mobile station 11 according to the present invention, and the mobile station 11 comprises a processor 111 and a transceiver 113. FIG. 1C is a block diagram of the first base station 13 according to the present invention, and the first base station 13 comprises a processor 131 and a transceiver 133. The interaction between the LAA network system 1 and the devices thereof will be further described hereinafter.

First, as shown in FIG. 1A, the processor 111 of the mobile station 11 determines a use status (not shown) of an unlicensed band via the transceiver 113, and accordingly generates first available unlicensed channel group information 110. The first available unlicensed channel group information 110 records at least one idle and available unlicensed channel, and in this embodiment, the first available unlicensed channel group information 110 records a first unlicensed channel UCH1.

Next, the transceiver 113 of the mobile station 11 transmits the first available unlicensed channel group information 110 to the first base station 13. In other words, the transceiver 133 of the first base station 13 receives the first available unlicensed channel group information 110 from the mobile station 11. Thereafter, the processor 131 of the first base station 13 selects the first unlicensed channel UCH1 according to the unlicensed channel information 110.

Finally, the processor 131 of the first base station 13 initializes a communication schedule assessment procedure (not shown) with the mobile station 11 through the first unlicensed channel UCH1 and via the transceiver 133. In other words, the processor 111 of the mobile station 11 initializes a communication schedule assessment procedure with the first base station 13 through the first unlicensed channel UCH1 and via the transceiver 113. In this way, the mobile station assists in determining the unlicensed channel and reports the determination result to the base station so that the base station can more clearly learn the channel use demand of each mobile station to improve the network resource utilization ratio and meanwhile reduce the load of the base station.

It shall be particularly appreciated that, the aforesaid communication schedule assessment procedure may comprise steps including: (1) assessing whether the channel is available, and if it is determined that the channel is available after the assessment, then performing channel resource scheduling for the available channel and deciding that the scheduling succeeds; or (2) deciding that the schedule fails if it is determined that the channel is unavailable after the assessment. The technical meaning of the communication schedule assessment procedure in the present invention shall be readily appreciated by those skilled in the art according to the disclosure of the present invention, and thus will not be further described herein.

Figure 2A:
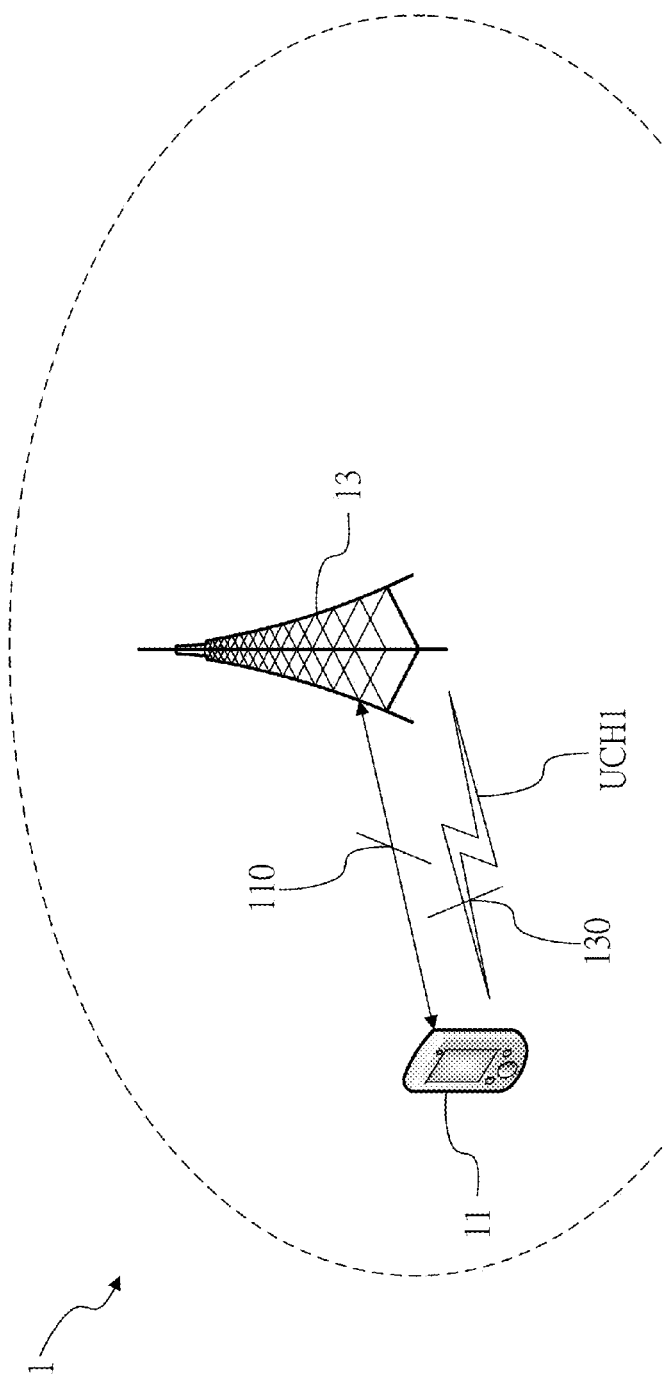
FIG. 2A to FIG. 2B are schematic views of an LAA network system according to a second embodiment of the present invention.
Figure 2B:
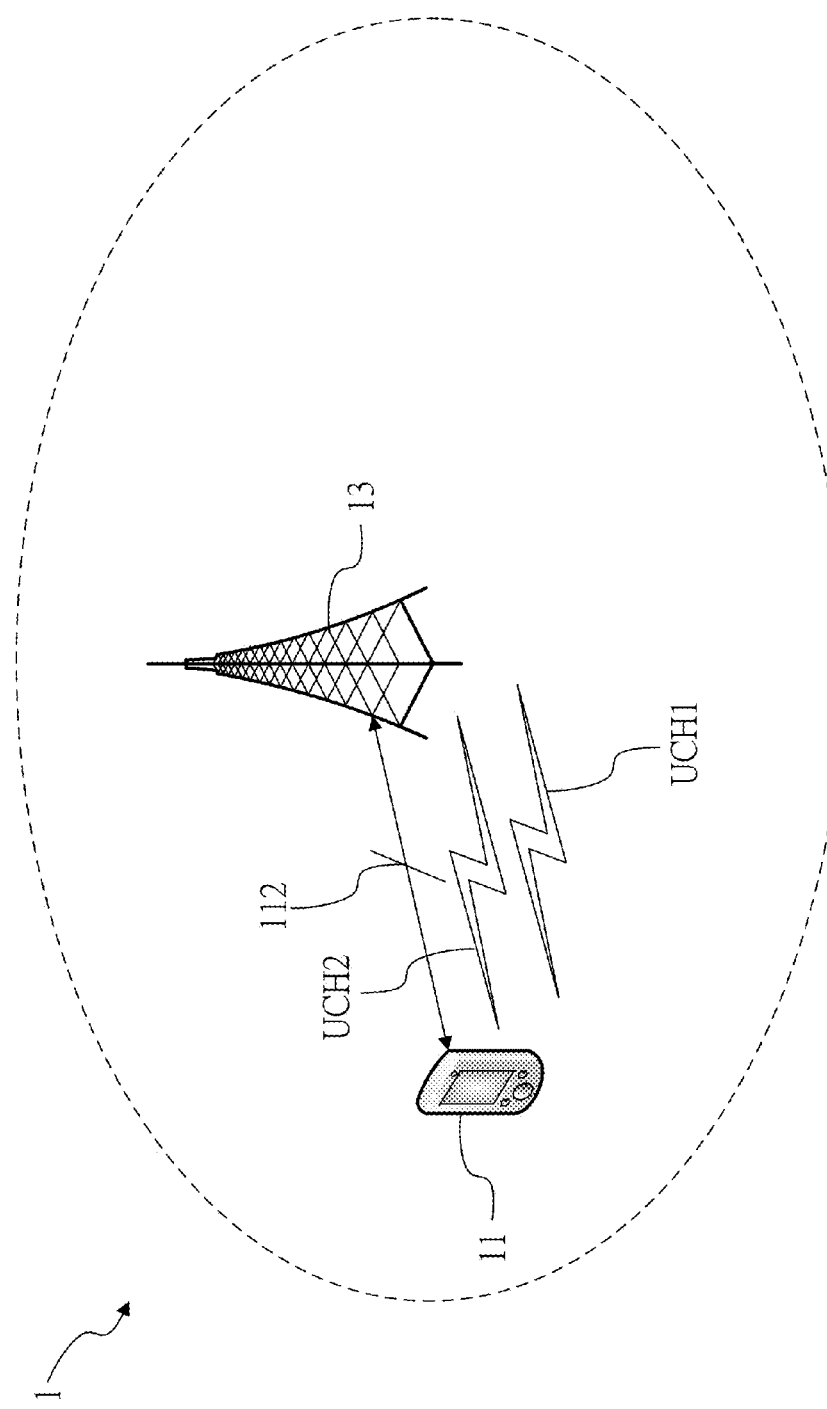

Please refer to FIG. 2A to FIG. 2B, which are schematic views of an LAA network system 1 according to a second embodiment of the present invention. The architecture of the second embodiment is similar to that of the first embodiment, so elements labeled by the same reference numerals have the same functions and thus will not be further described herein. However, the second embodiment mainly describes in more detail the processing for the success or the failure of the communication schedule assessment procedure.

Further speaking, as shown in FIG. 2A, after the mobile station 11 initializes the communication schedule assessment procedure with the first base station 13 through the first unlicensed channel UCH1, the processor 131 of the first base station 13 accordingly determines that the communication schedule assessment procedure succeeds after assessing that the first unlicensed channel UCH1 is available (i.e., has not yet been occupied by other devices and is in a good channel status), and the first base station 13 directly transmits schedule information 130 to the mobile station 11 through the first unlicensed channel UCH1 and via the transceiver 133. In other words, the transceiver 113 of the mobile station 11 may receive the schedule information 130 from the first base station 13 through the first unlicensed channel UCH1.

On the other hand, as shown in FIG. 2B, after the mobile station 11 initializes the communication schedule assessment procedure with the first base station 13 through the first unlicensed channel UCH1, the processor 111 of the mobile station 11 may again determine a use status of the unlicensed band after determining that the communication schedule assessment procedure fails and generate second available unlicensed channel group information 112. The second available unlicensed channel group information 112 records a second unlicensed channel UCH2.

Next, similarly, the transceiver 113 of the mobile station 11 transmits the second available unlicensed channel group information 112 to the first base station 13. In other words, the transceiver 133 of the first base station 13 receives the second available unlicensed channel group information 112 from the mobile station 11. Thereafter, the processor 131 of the first base station 13 selects the second unlicensed channel UCH2 according to the second available unlicensed channel group information 112.

Finally, the processor 131 of the first base station 13 reinitializes a communication schedule assessment procedure with the mobile station 11 through the second unlicensed channel UCH2 and via the transceiver 133. In other words, the processor 111 of the mobile station 11 reinitializes a communication schedule assessment procedure with the first base station 13 through the second unlicensed channel UCH2 and via the transceiver 113. In this way, after the communication schedule assessment procedure fails, the communication schedule assessment procedure may still be reinitialized via the same steps between the mobile station and the first base station.

It shall be particularly appreciated that, the situation where the aforesaid communication schedule assessment procedure fails may be that the mobile station has not received a base station communication instruction within a particular time period or the mobile station directly receives a procedure failure instruction from the base station. The steps and processes thereof shall be readily appreciated by those skilled in the art according to the disclosure of the present invention, and thus will not be further described herein. Moreover, the schedule information may comprise relevant uplink or downlink transmission schedule information, which may also be appreciated by those skilled in the art and thus will not be further described herein.

Figure 3A:
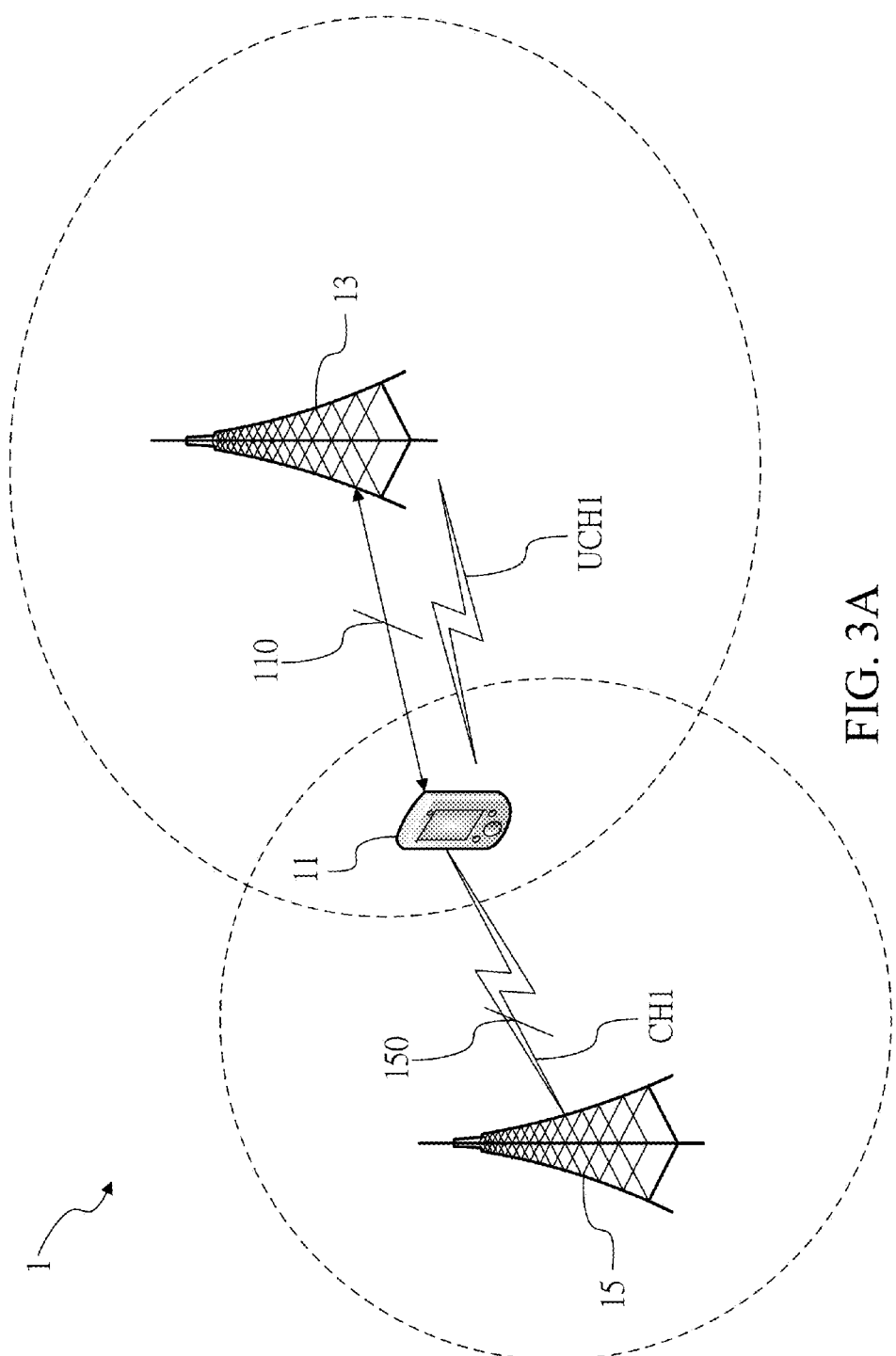
FIG. 3A to FIG. 3B are schematic views of an LAA network system according to a third embodiment of the present invention.
Figure 3B:
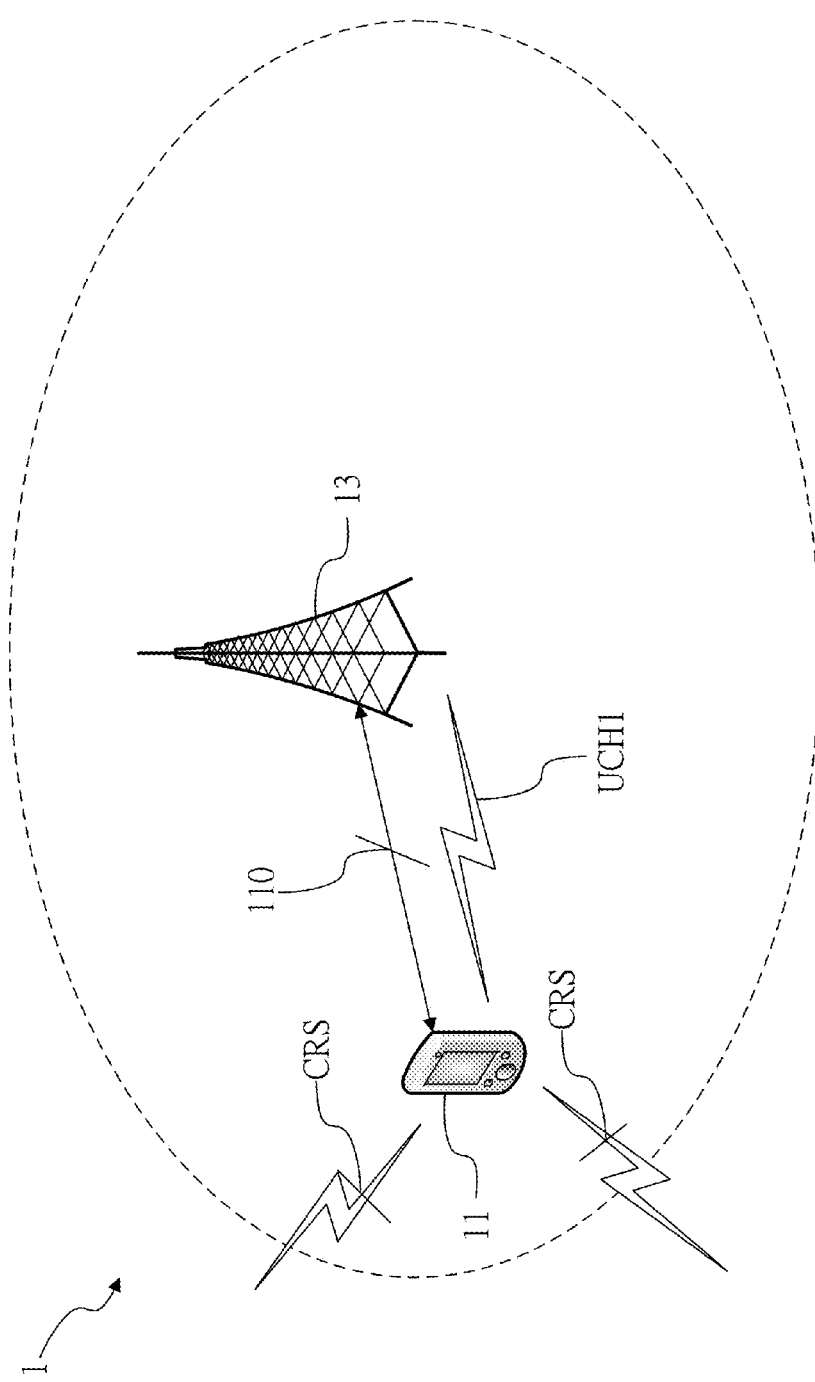

Please refer to FIG. 3A to FIG. 3B, which are schematic views of an LAA network system 1 according to a third embodiment of the present invention. The architecture of the third embodiment is similar to that of the aforesaid embodiments, so elements labeled by the same reference numerals have the same functions and thus will not be further described herein. However, the third embodiment mainly describes in more detail how the mobile station determines the use status of the unlicensed band.

Specifically, the mobile station may first receive the use information of unlicensed channels of other base stations from the other base stations, so the use status of the unlicensed channel within the communication coverage of the mobile station may be accordingly determined. As shown in FIG. 3A, the mobile station 11 may receive relevant information of a licensed channel CH1 from a second base station 15, and thereby connect to the second base station 15 via the licensed channel CH1. Therefore, the transceiver 113 of the mobile station 11 may receive unlicensed channel schedule information 150 from the second base station 15 via the licensed channel CH1. The unlicensed channel schedule information 150 records the use status of the unlicensed channel within the communication coverage of the second base station 15.

In this way, the processor 111 of the mobile station 11 can determine the use status of the unlicensed band according to the unlicensed channel schedule information 150 and thereby avoid the unlicensed channel used by the second base station 15 so as to generate the first available unlicensed channel group information 110.

In another implementation, the processor 111 of the mobile station 11 receives at least one piece of channel reservation information CRI within the unlicensed band via the transceiver 113 as shown in FIG. 3B. The at least one piece of channel reservation information may be the channel reservation information transmitted on a particular unlicensed channel by other base stations (other than the first base station) or mobile stations served by the other base stations to reserve the particular unlicensed channel.

In this way, the processor 111 of the mobile station 11 can learn which unlicensed channels have been reserved according to the at least one piece of channel reservation information CRI via the transceiver 113, thereby generating the first available unlicensed channel group information 110.

Figure 4A:
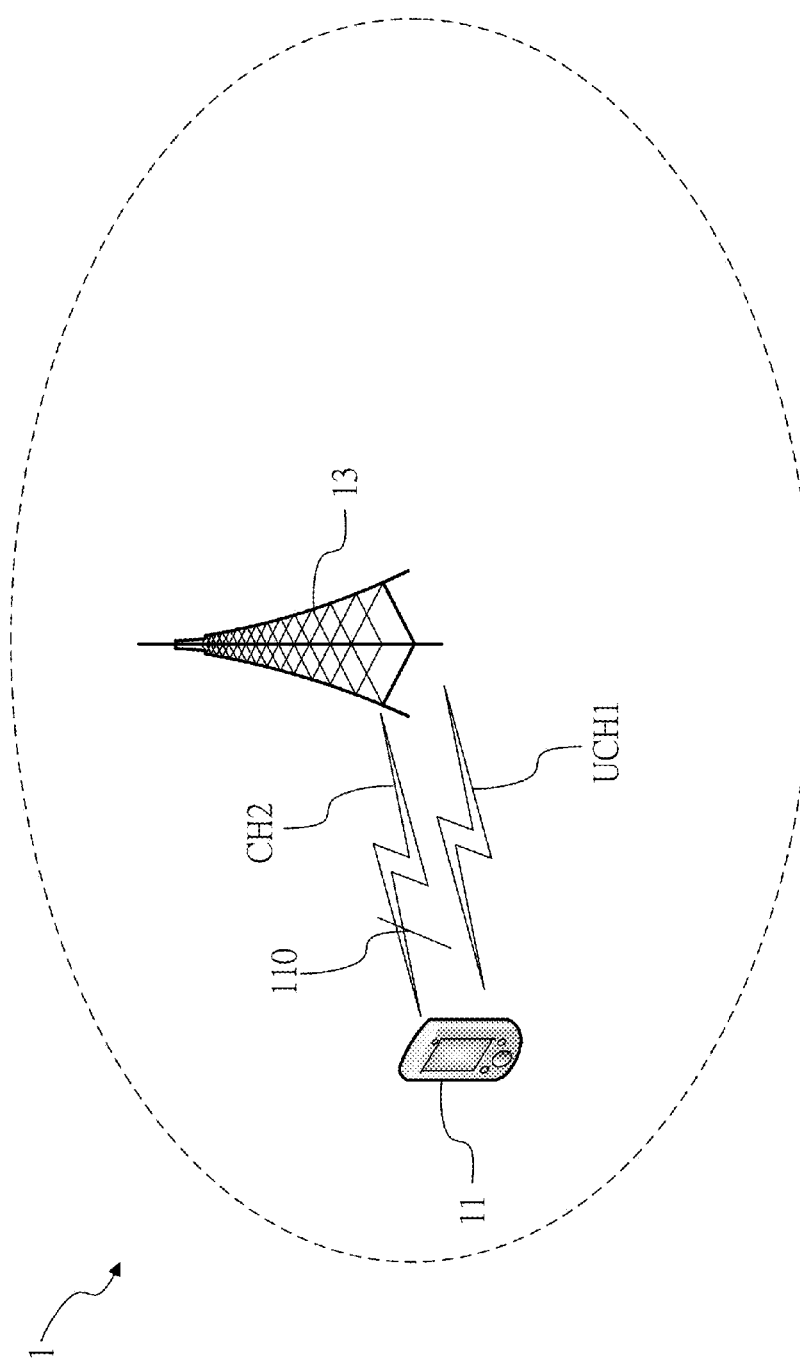
FIG. 4A to FIG. 4C are schematic views of an LAA network system according to a fourth embodiment of the present invention.
Figure 4B:
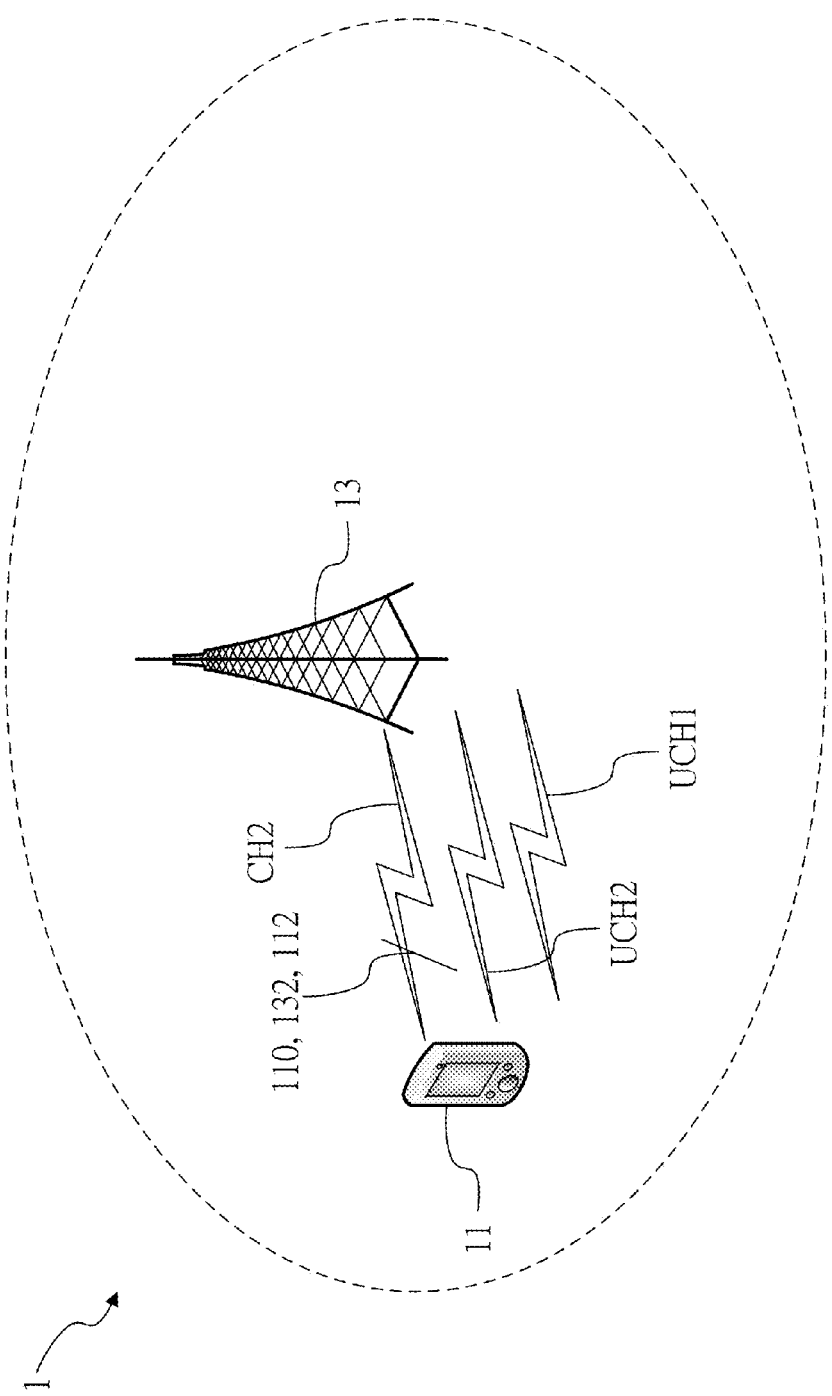
Figure 4C:
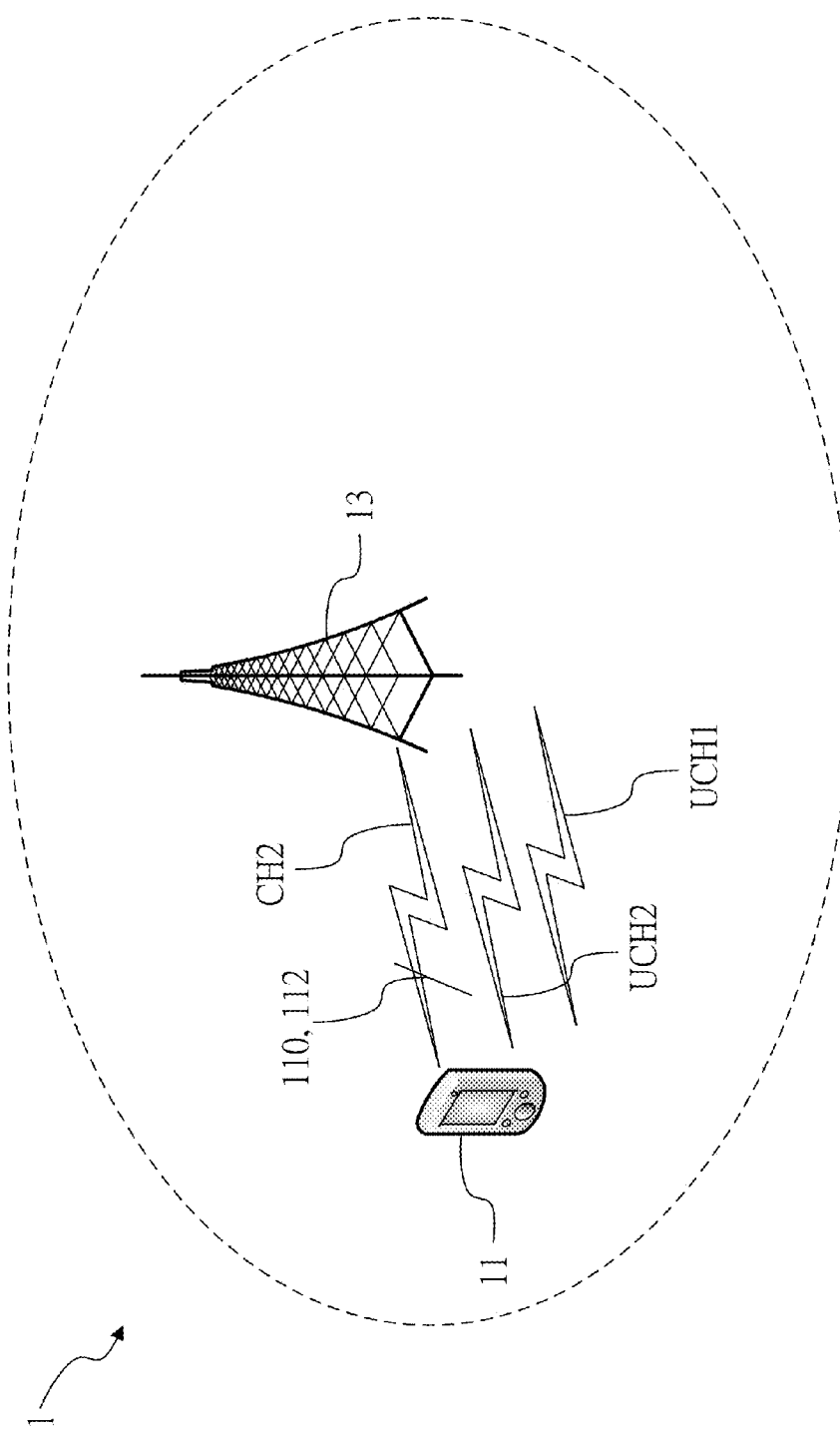

Please refer to FIG. 4A to FIG. 4C, which are schematic views of an LAA network system 1 according to a fourth embodiment of the present invention. The architecture of the fourth embodiment is similar to that of the aforesaid embodiments, so elements labeled by the same reference numerals have the same functions and thus will not be further described herein. However, the fourth embodiment mainly describes in more detail how the mobile station transmits the unlicensed channel information to the base station and how the communication schedule assessment procedure is reinitialized after it fails.

Specifically, the mobile station may directly transmit the unlicensed channel information to the base station through the licensed channel. As shown in FIG. 4A, the mobile station 11 communicates with the first base station 13 through a licensed channel CH2. Therefore, in the situation where the licensed channel CH2 is highly independent, the transceiver 113 of the mobile station 11 may directly transmit the first available unlicensed channel group information 110 to the first base station 13 through the licensed channel CH2. In other words, the transceiver 133 of the first base station 13 receives the first available unlicensed channel group information 110 from the mobile station 11 through the licensed channel CH2.

As shown in FIG. 4B, when the mobile station 11 communicates with the first base station 13 through the licensed channel CH2, the processor 131 of the first base station 13 transmits channel measurement request information 132 to the mobile station 11 through the licensed channel CH2 and via the transceiver 133 after initializing the communication schedule assessment procedure and determining that the communication schedule assessment procedure fails. In other words, the transceiver 113 of the mobile station 11 receives the channel measurement request information 132 from the first base station 13.

It shall be additionally appreciated that, in other implementations, the communication schedule assessment procedure may comprise the Listen Before Talk (LBT) assessment technology to assess whether the channel is available. If the LBT fails, then it means that the initialization of the communication schedule assessment procedure fails. The application of the LBT shall be readily appreciated by those skilled in the art according to the above disclosure of the present invention, and thus will not be further described herein.

Thereafter, similarly, the processor 111 of the mobile station 11 determines the use status of other unlicensed bands according to the channel measurement request information 132 and generates second available unlicensed channel group information 112. The second available unlicensed channel group information 112 records the second unlicensed channel UCH2.

Next, similarly, the transceiver 113 of the mobile station 11 transmits the second available unlicensed channel group information 112 to the first base station 13. In other words, the transceiver 133 of the first base station 13 receives the second available unlicensed channel group information 112 from the mobile station 11. Thereafter, the processor 131 of the first base station 13 selects the second unlicensed channel UCH2 according to the second available unlicensed channel group information 112.

Finally, the processor 131 of the first base station 13 reinitializes a communication schedule assessment procedure with the mobile station 11 through the second unlicensed channel UCH2 and via the transceiver 133. In other words, the processor 111 of the mobile station 11 reinitializes a communication schedule assessment procedure with the first base station 13 through the second unlicensed channel UCH2 and via the transceiver 113.

In another implementation, the mobile station may determine on its own that the communication schedule fails and reinitialize the communication schedule assessment procedure. As shown in FIG. 4C, the processor 111 of the mobile station 11 determines that no schedule information of the first base station 13 is received in the licensed channel CH2 via the transceiver 113 during a time period (not shown), which means that the first base station 13 cannot use the first unlicensed channel UCH1 for data transmission.

Accordingly, the processor 111 of the mobile station 11 can determine that the communication schedule fails and again determine the use status of the unlicensed band via the transceiver 113 to generate the second available unlicensed channel group information 112. Next, the transceiver 113 of the mobile station 11 transmits the second available unlicensed channel group information 112 to the first base station 13. In other words, the transceiver of the first base station 13 receives the second available unlicensed channel group information 112 from the mobile station 11.

Next, the processor 131 of the first base station 13 can select the second unlicensed channel UCH2 according to the second available unlicensed channel group information 112 and reinitialize the communication schedule assessment procedure with the mobile station 11 through the second unlicensed channel UCH2 and via the transceiver 133. In other words, the processor 111 of the mobile station 11 reinitializes the communication schedule assessment procedure with the first base station 13 through the second unlicensed channel UCH2 and via the transceiver 113.

Figure 5A:
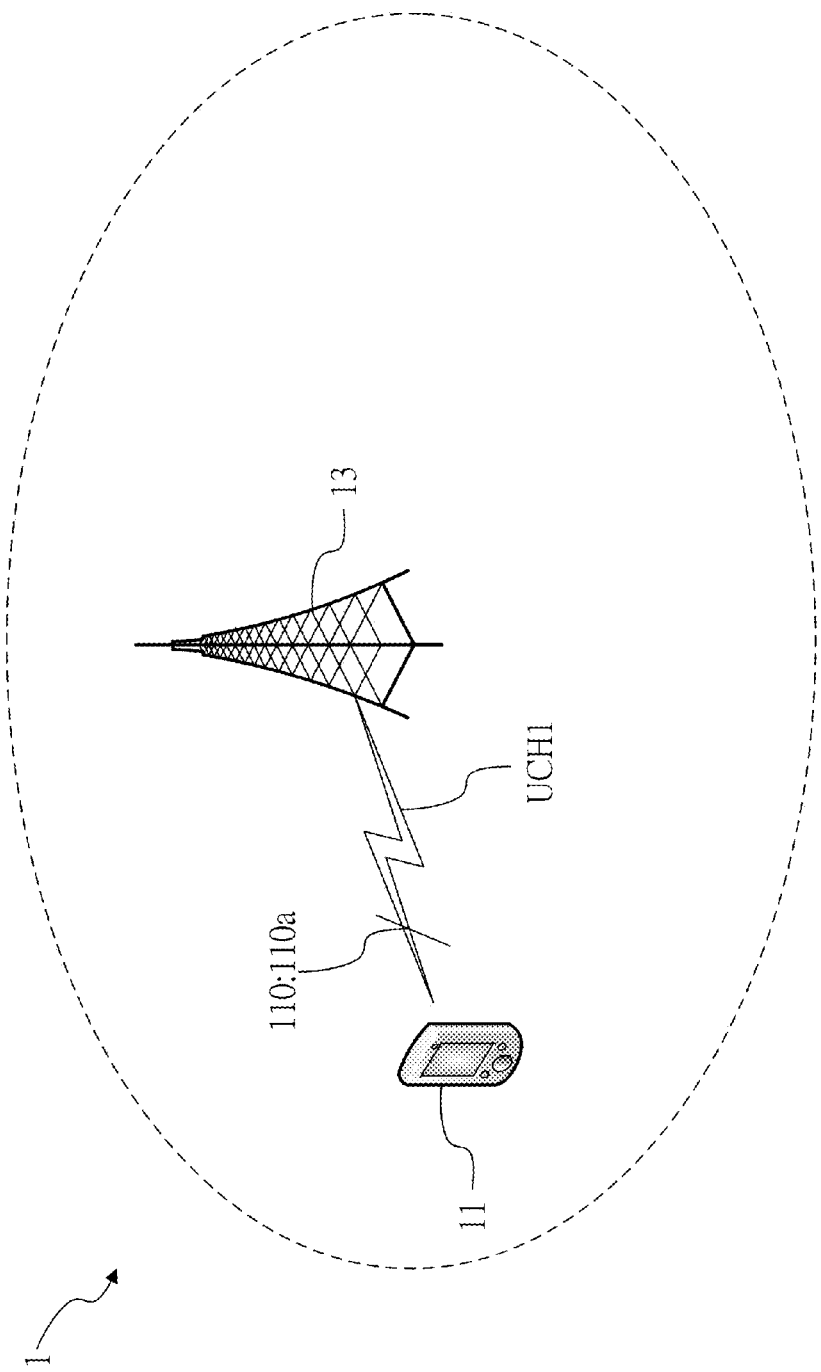
FIG. 5A to FIG. 5C are schematic views of an LAA network system according to a fifth embodiment of the present invention.
Figure 5B:
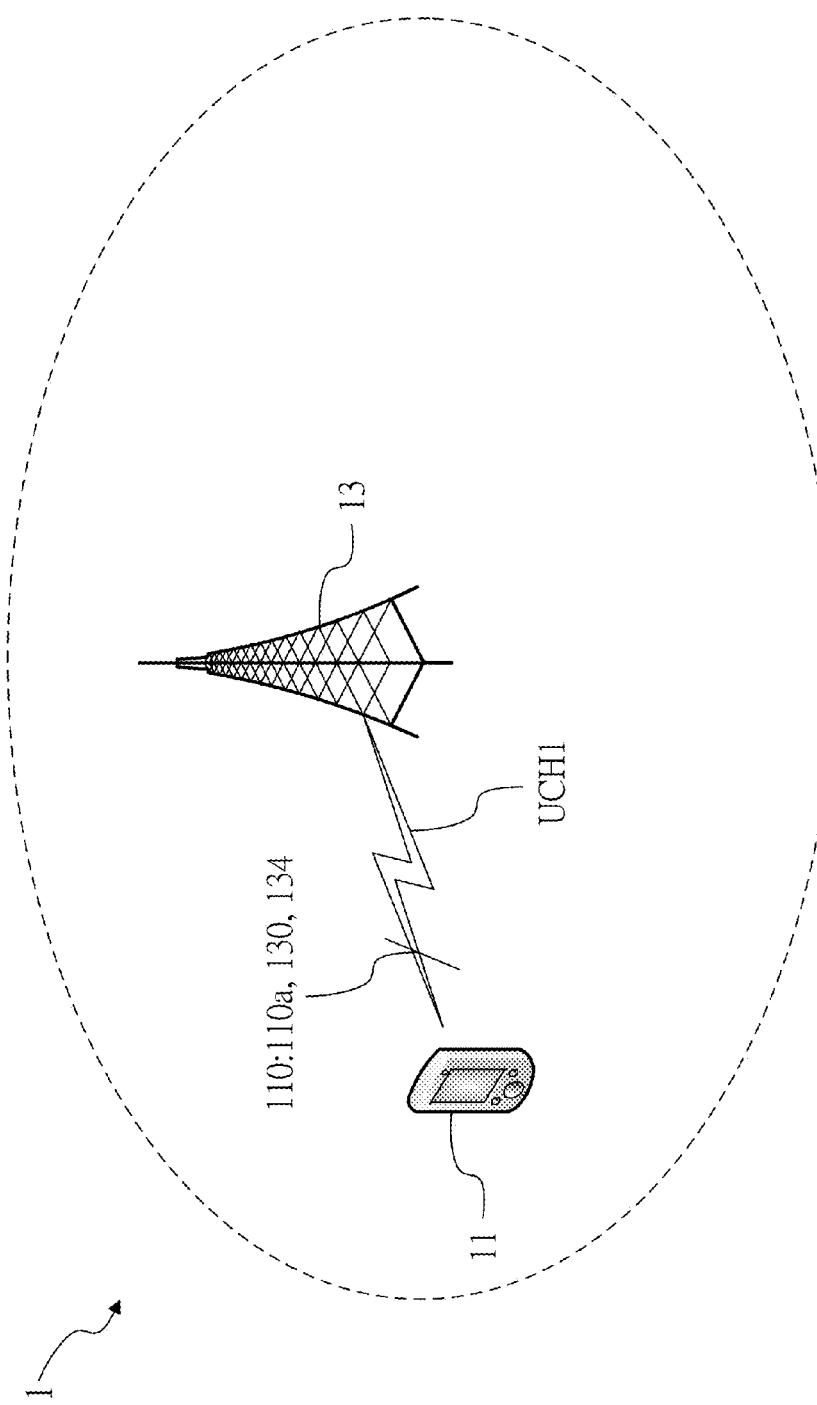
Figure 5C:
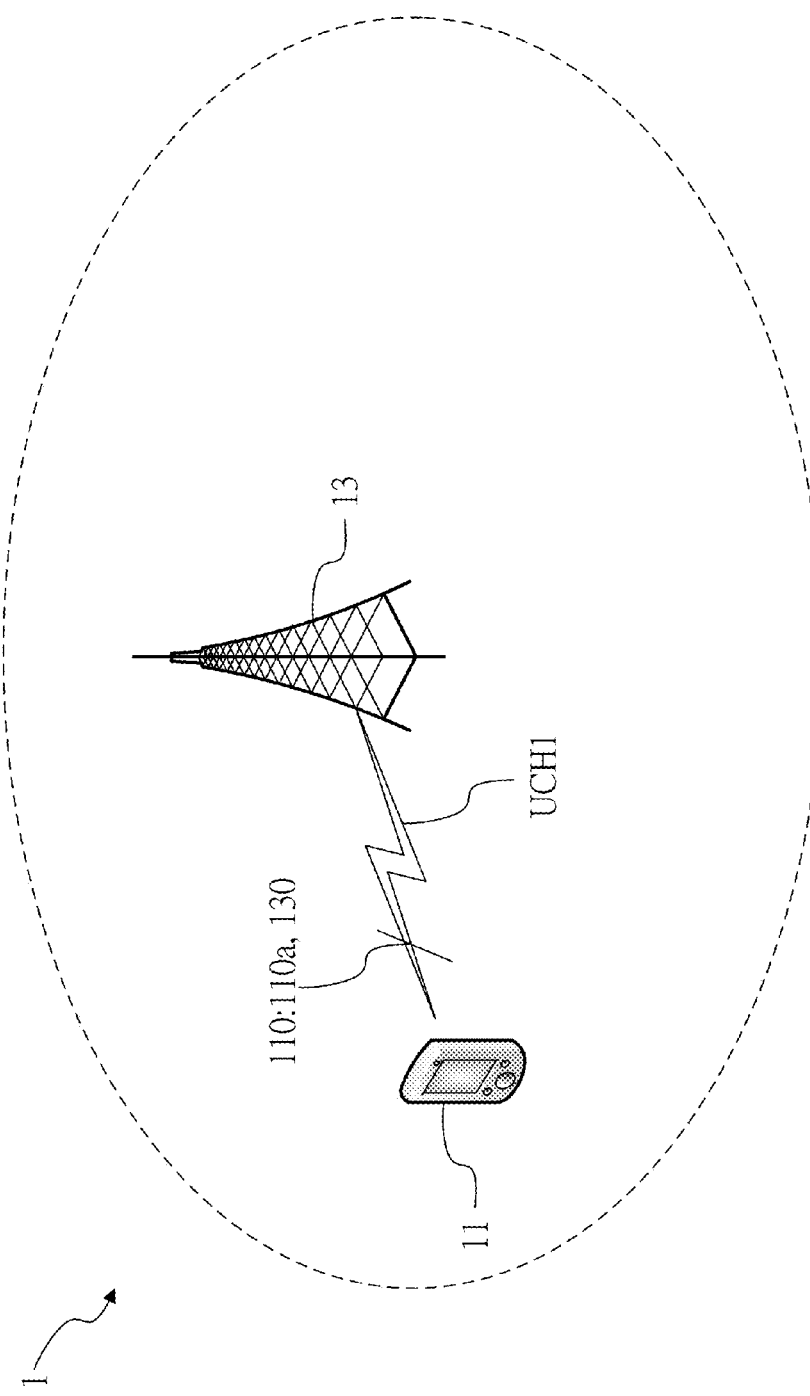

Please refer to FIG. 5A to FIG. 5C, which are schematic views of an LAA network system 1 according to a fifth embodiment of the present invention. The architecture of the fifth embodiment is similar to that of the aforesaid embodiments, so elements labeled by the same reference numerals have the same functions and thus will not be further described herein. However, the fifth embodiment mainly describes other implementations in more detail, e.g., how the mobile station transmits the unlicensed channel information to the base station and how the communication schedule assessment procedure is reinitialized after it fails.

Specifically, the available unlicensed channel information may comprise the channel reservation information, and the mobile station may continuously transmit the channel reservation information to the base station directly in the unlicensed channel. As shown in FIG. 5A, the first available unlicensed channel group information 110 comprises channel reservation information 110a, and the transceiver 113 of the mobile station 11 may continuously transmit the channel reservation information 110a to the first base station 13 directly in the first unlicensed channel UCH1. In other words, the transceiver 133 of the first base station 13 continuously receives the channel reservation information 110a from the mobile station 11 through the unlicensed channel UCH1.

In an implementation, as shown in FIG. 5B, the transceiver 133 of the first base station 13 detects the channel reservation information 110a of the mobile station 11 in the first unlicensed channel UCH1, which means that the mobile station 11 has made reservation for the first unlicensed channel UCH1. Therefore, the processor 131 of the first base station 13 accordingly selects the first unlicensed channel UCH1.

Next, the processor 131 of the first base station 13 further determines whether a signal quality (not shown) of the channel reservation information 110a of the first unlicensed channel UCH1 exceeds a threshold (not shown). If the determination result is no, then it means that the signal transmission between the mobile station 11 and the first base station 13 through the first unlicensed channel UCH1 may be unstable, so the communication schedule assessment procedure is reinitialized in the way described in the previous embodiments.

On the other hand, if the signal quality of the channel reservation information 110a exceeds the threshold, then the first base station 13 may prepare to communicate with the mobile station 11. Therefore, the transceiver 133 of the first base station 13 transmits a stop channel reservation notice 134 to the mobile station 11 and prepares to transmit schedule information 130 (e.g., the uplink or downlink schedule information) through the first unlicensed channel UCH1.

It shall be particularly appreciated that, the signal quality may be determined by the Signal Noise Ratio (SNR), the signal power or the like and the quality threshold may also be adjusted according to the network environment, and this shall be appreciated by those skilled in the art and thus will not be further described herein.

On the other hand, the transceiver 113 of the mobile station 11 stops transmitting the channel reservation information 110a to the first base station 13 after receiving the stop channel reservation notice 134 from the first base station 13. Thereafter, the transceiver 113 of the mobile station 11 receives the schedule information 130 from the first base station 13 through the first unlicensed channel UCH1.

In another implementation, as shown in FIG. 5C, the transceiver 133 of the first base station 13 similarly detects the channel reservation information 110a of the mobile station 11 in the first unlicensed channel UCH1, which means that the mobile station 11 has made reservation for the first unlicensed channel UCH1. Therefore, the processor 131 of the first base station 13 accordingly selects the first unlicensed channel UCH1.

Next, the processor 131 of the first base station 13 further determines whether the signal quality of the channel reservation information 110a of the first unlicensed channel UCH1 exceeds a threshold. If the determination result is no, then it means that the signal transmission between the mobile station 11 and the first base station 13 through the first unlicensed channel UCH1 may be unstable, so the communication schedule assessment procedure is reinitialized in the way described in the previous embodiments.

On the other hand, if the determination result is yes, then the first base station 13 may directly transmit the schedule information 130 to the mobile station 11 through the first unlicensed channel UCH1 and via the transceiver 133 without first notifying the mobile station 11 with an additional notice message. The processor 111 of the mobile station 11 may directly stop transmitting the channel reservation information 110a from the time instant at which the transceiver 113 receives the schedule information 130.

Figure 6:
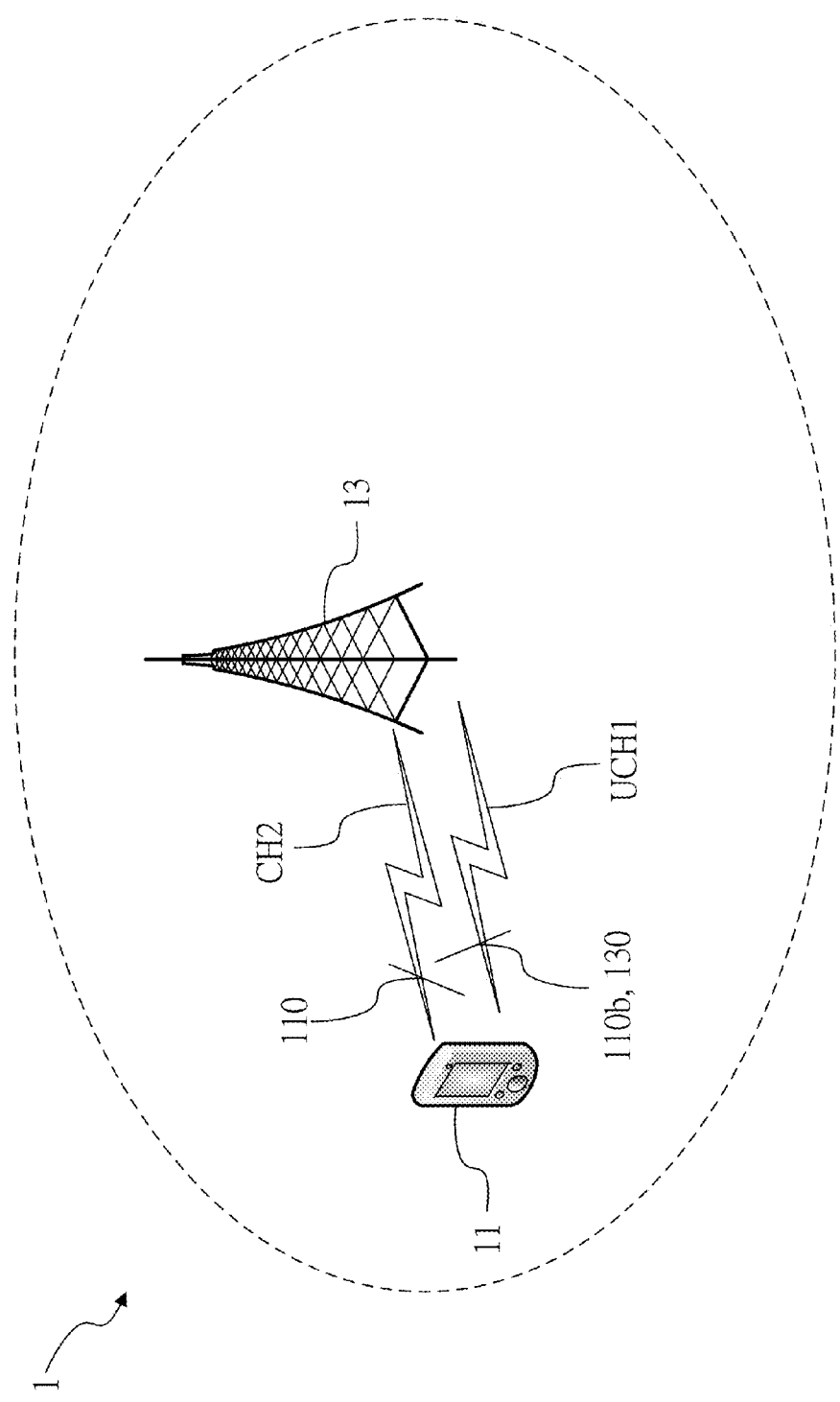
FIG. 6 is a schematic view of an LAA network system according to a sixth embodiment of the present invention.

Please refer to FIG. 6, which is a schematic view of an LAA network system 1 according to a sixth embodiment of the present invention. The architecture of the sixth embodiment is similar to that of the aforesaid embodiments, so elements labeled by the same reference numerals have the same functions and thus will not be further described herein. However, the sixth embodiment mainly describes in more detail how the mobile station transmits the relevant information using both the unlicensed channel and the licensed channel.

Specifically, in the sixth embodiment, the first available unlicensed channel group information 110 comprises channel reservation information 110b, and the transceiver 113 of the mobile station 11 continuously transmits the channel reservation information 110b in the first unlicensed channel UCH1 mainly for notifying other devices that the first unlicensed channel UCH1 has been reserved. On the other hand, the transceiver 113 of the mobile station 11 transmits the first available unlicensed channel group information 110 to the first base station 13 through the licensed channel CH2.

Next, after the mobile station 11 initializes the communication schedule assessment procedure with the first base station 13, the processor 131 of the first base station 13 determines whether a signal quality (not shown) of the channel reservation information 110b of the first unlicensed channel UCH1 exceeds a threshold according to the first available unlicensed channel group information 110. If the determination result is no, then it means that the signal transmission between the mobile station 11 and the first base station 13 through the first unlicensed channel UCH1 may be unstable, so the communication schedule assessment procedure is reinitialized in the way described in the previous embodiments.

On the other hand, if the signal quality of the channel reservation information 110b exceeds the threshold, then the first base station 13 may prepare to communicate with the mobile station 11. In the case where the mobile station 11 continuously reserves the first unlicensed channel UCH1 via the channel reservation information 110b, the transceiver 133 of the first base station 13 may directly transmit the schedule information 130 to the mobile station 11 through the first unlicensed channel UCH1.

In more detail, in the sixth embodiment, the technology of transmitting the first available unlicensed channel group information 110 through the licensed channel CH2 is mainly intended to directly allow the devices to select the channel according to the first available unlicensed channel group information 110 by virtue of the stability of the licensed channel CH2. Continuously transmitting the channel reservation information 110b in the first unlicensed channel UCH1 is mainly intended to preoccupy the available channel and allow the base station to directly perform the channel assessment of the first unlicensed channel UCH1 by using the channel reservation information 110b.

It shall be particularly appreciated that, in the aforesaid embodiments, if the channel reservation information is uplink information when the channel reservation information is transmitted in the unlicensed channel, then the channel reservation information may also be directly used as the uplink channel scheduling request message and may carry relevant information such as a buffer status report.

Additionally, in the aforesaid embodiments, the channel reservation information may also be one of a channel reservation signal sequence and a channel reservation message packet. The channel reservation message packet is transmitted in the unlicensed channel or the licensed channel, and may carry the channel communication quality, the channel use status and the device-related information at the same time.

Besides reserving the channel by directly occupying the channel, the channel reservation signal sequence can also give corresponding information or allow other devices to assess the channel status via the patterns of different signal sequences. The relevant technical content and application shall be readily appreciated by those skilled in the art according to the above disclosure, and thus will not be further described herein.

Figure 7:
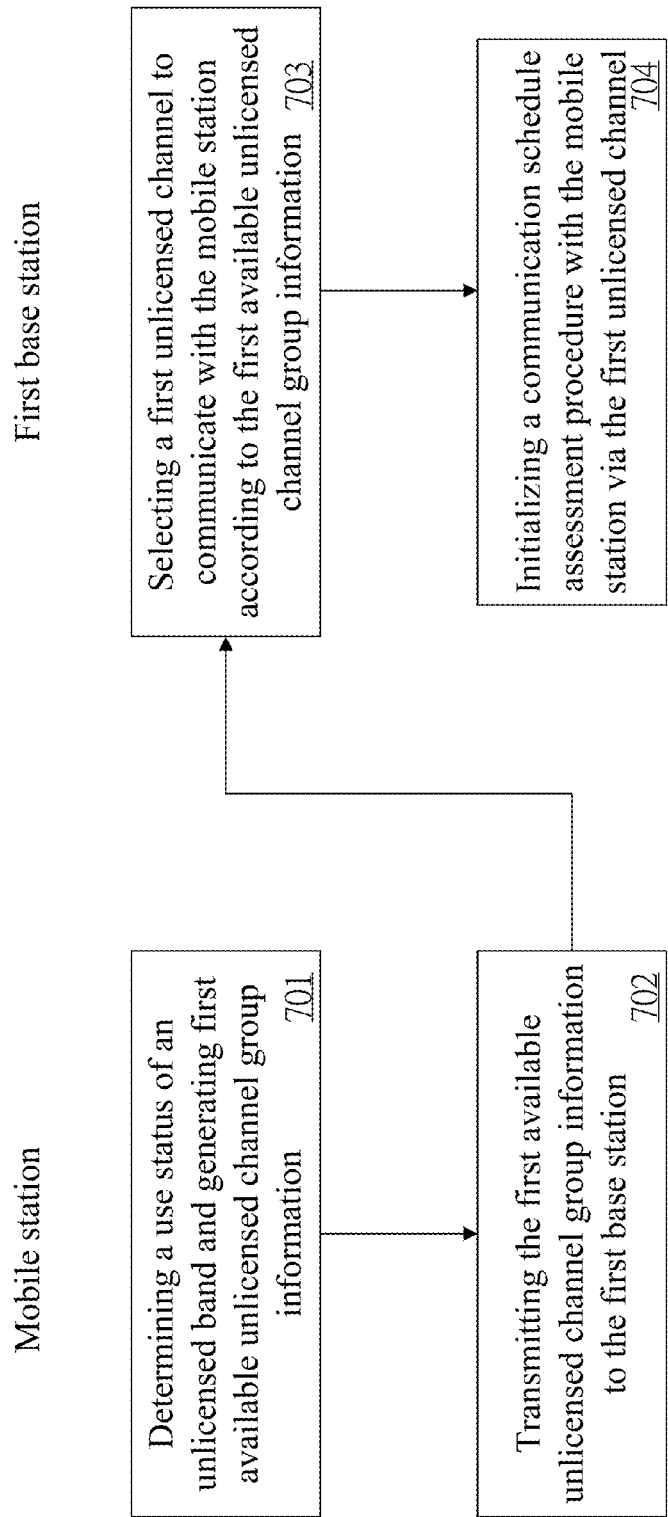
FIG. 7 is a flowchart diagram of a channel access method according to a seventh embodiment of the present invention.

A seventh embodiment of the present invention is a channel access method, referring to FIG. 7 for a flowchart diagram of the method. The method of the seventh embodiment is for use in an LAA network system (e.g., the LAA network system 1 of the aforesaid embodiments) which comprises a mobile station and a first base station. Detailed steps of the seventh embodiment are as follows.

First, step 701 is executed to enable the mobile station to determine a use status of an unlicensed band and generate first available unlicensed channel group information. Step 702 is executed to enable the mobile station to transmit the first available unlicensed channel group information to the first base station. The first available unlicensed channel group information records an available status of a first unlicensed channel.

Next, step 703 is executed to enable the first base station to select a first unlicensed channel to communicate with the mobile station according to the first available unlicensed channel group information. Finally, step 704 is executed to enable the first base station to initialize a communication schedule assessment procedure with the mobile station via the first unlicensed channel.

Figure 8:
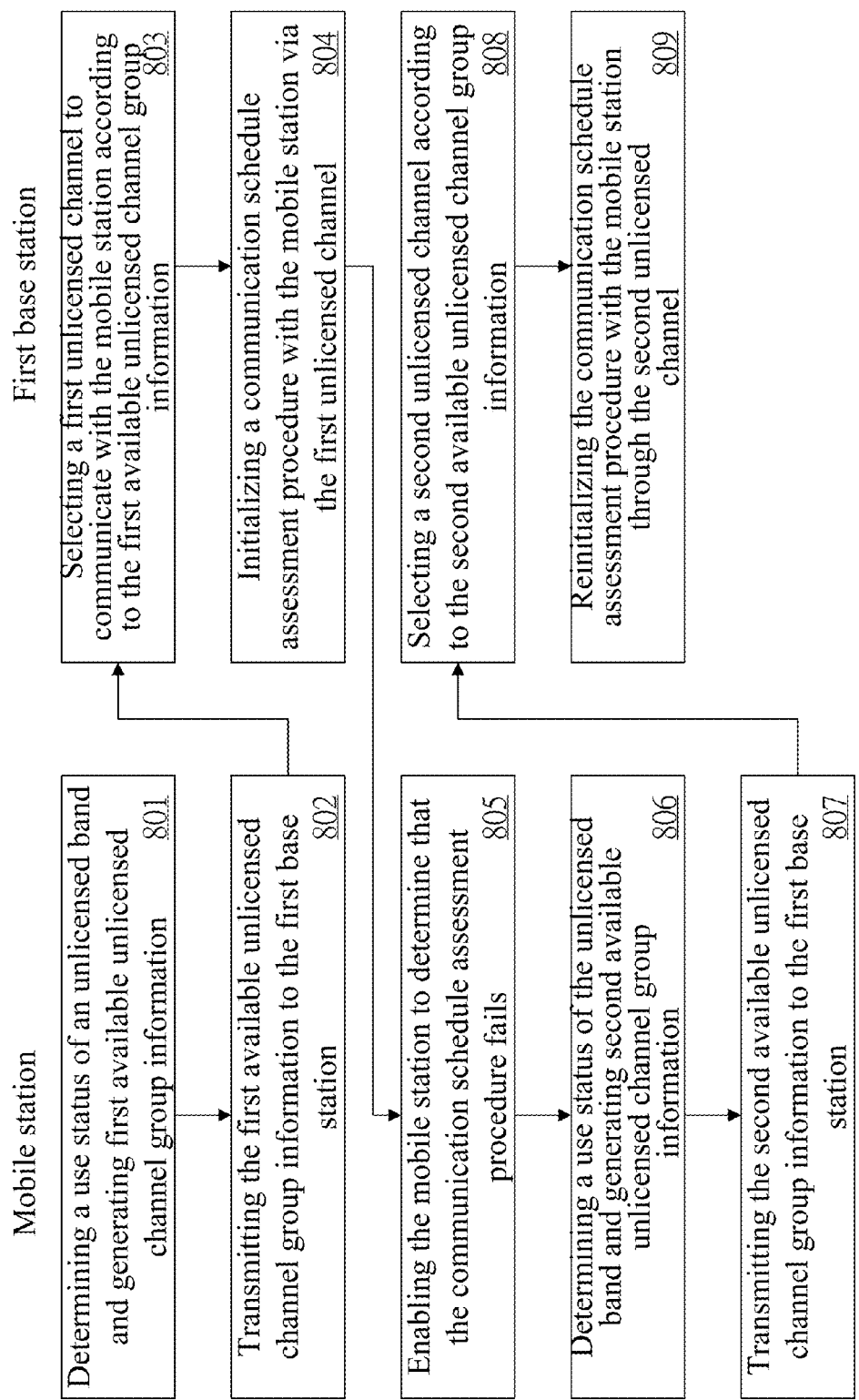
FIG. 8 is a flowchart diagram of a channel access method according to an eighth embodiment of the present invention.

An eighth embodiment of the present invention is a channel access method, referring to FIG. 8 for a flowchart diagram of the method. The method of the eighth embodiment is for use in an LAA network system (e.g., the LAA network system 1 of the aforesaid embodiments) which comprises a mobile station and a first base station. Detailed steps of the eighth embodiment are as follows.

First, step 801 is executed to enable the mobile station to determine a use status of an unlicensed band and generate first available unlicensed channel group information. Step 802 is executed to enable the mobile station to transmit the first available unlicensed channel group information to the first base station. The first available unlicensed channel group information records an available status of a first unlicensed channel.

Next, step 803 is executed to enable the first base station to select a first unlicensed channel to communicate with the mobile station according to the first available unlicensed channel group information. Thereafter, step 804 is executed to enable the first base station to initialize a communication schedule assessment procedure with the mobile station via the first unlicensed channel. Step 805 is executed to enable the mobile station to determine that the communication schedule assessment procedure fails. Step 806 is executed to enable the mobile station to determine a use status of the unlicensed band according to the determination result of the step 805 and generate second available unlicensed channel group information.

Step 807 is executed to enable the mobile station to transmit the second available unlicensed channel group information to the first base station. Step 808 is executed to enable the first base station to select a second unlicensed channel according to the second available unlicensed channel group information. Finally, step 809 is executed to enable the first base station to reinitialize the communication schedule assessment procedure with the mobile station through the second unlicensed channel.

Figure 9:
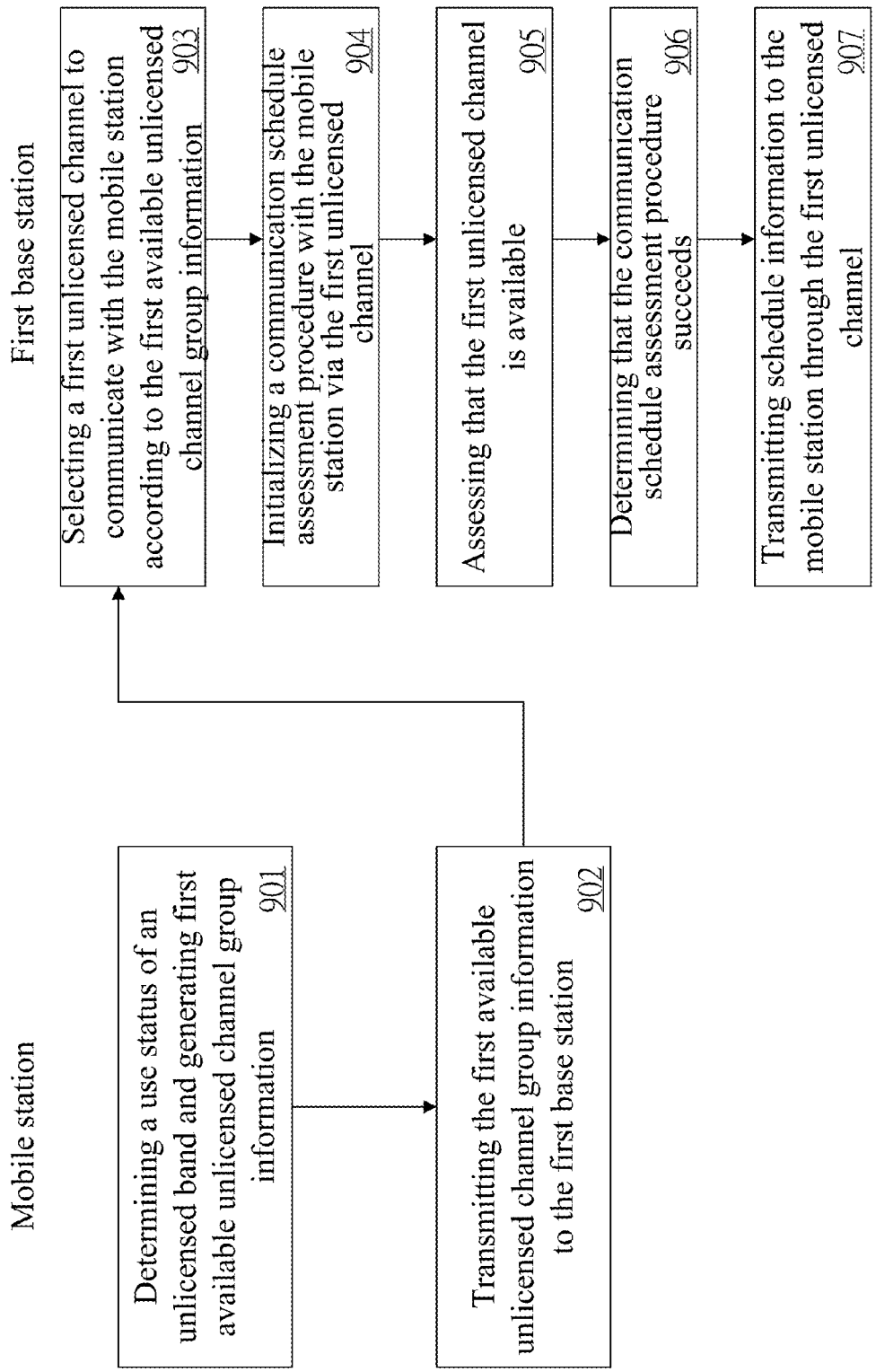
FIG. 9 is a flowchart diagram of a channel access method according to a ninth embodiment of the present invention.

A ninth embodiment of the present invention is a channel access method, referring to FIG. 9 for a flowchart diagram of the method. The method of the ninth embodiment is for use in an LAA network system (e.g., the LAA network system 1 of the aforesaid embodiments) which comprises a mobile station and a first base station. Detailed steps of the ninth embodiment are as follows.

First, step 901 is executed to enable the mobile station to determine a use status of an unlicensed band and generate first available unlicensed channel group information. Step 902 is executed to enable the mobile station to transmit the first available unlicensed channel group information to the first base station. The first available unlicensed channel group information records an available status of a first unlicensed channel. Step 903 is executed to enable the first base station to select a first unlicensed channel to communicate with the mobile station according to the first available unlicensed channel group information.

Next, step 904 is executed to enable the first base station to initialize a communication schedule assessment procedure with the mobile station via the first unlicensed channel. Step 905 is executed to enable the first base station to assess that the first unlicensed channel is available. Step 906 is executed to enable the first base station to determine that the communication schedule assessment procedure succeeds. Finally, step 907 is executed to enable the first base station to transmit schedule information to the mobile station through the first unlicensed channel according to the result of the step 905.

Figure 10:
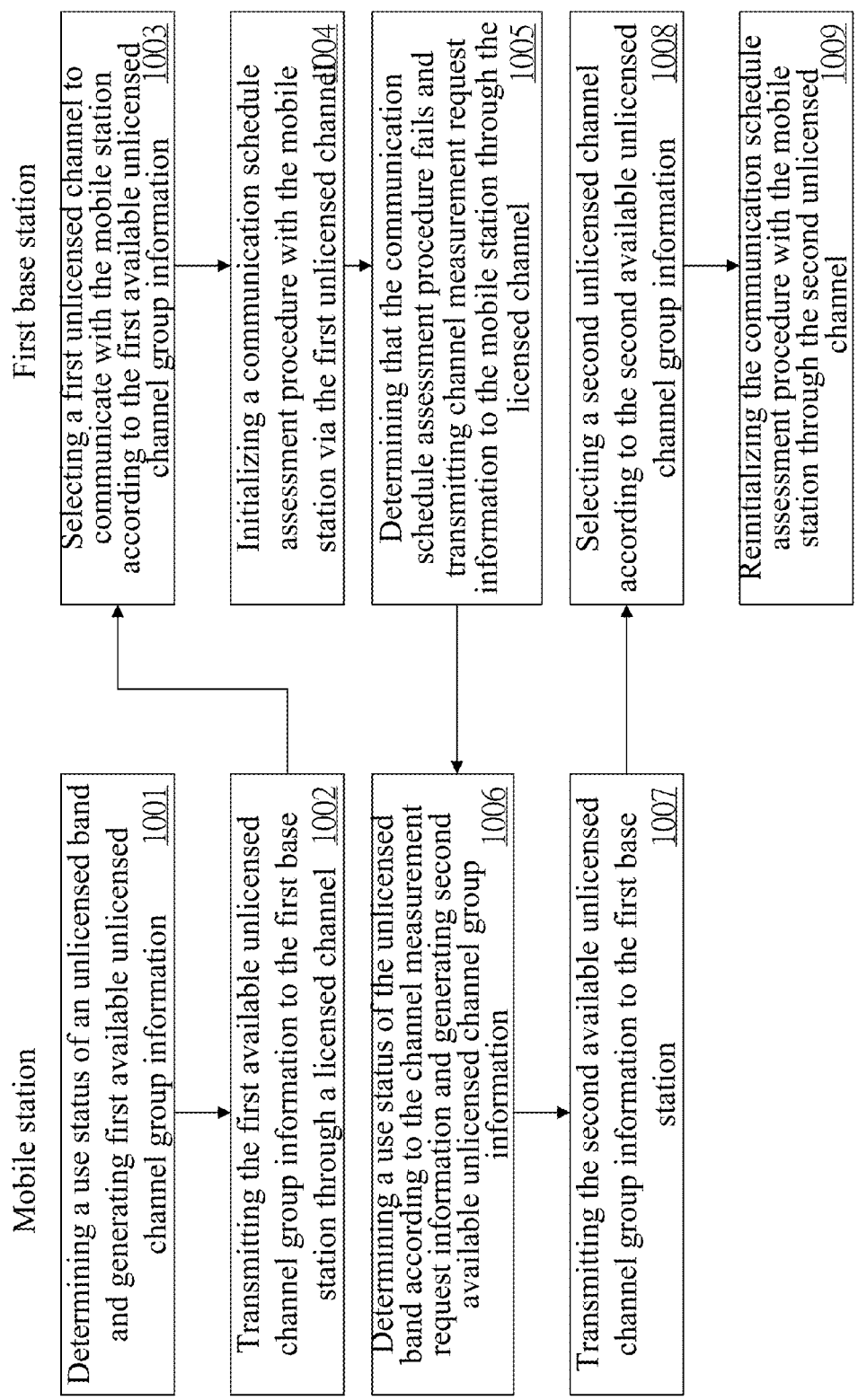
FIG. 10 is a flowchart diagram of a channel access method according to a tenth embodiment of the present invention.

A tenth embodiment of the present invention is a channel access method, referring to FIG. 10 for a flowchart diagram of the method. The method of the tenth embodiment is for use in an LAA network system (e.g., the LAA network system 1 of the aforesaid embodiments) which comprises a mobile station and a first base station. Detailed steps of the tenth embodiment are as follows.

First, step 1001 is executed to enable the mobile station to determine a use status of an unlicensed band and generate first available unlicensed channel group information. Step 1002 is executed to enable the mobile station to transmit the first available unlicensed channel group information to the first base station through a licensed channel. The first available unlicensed channel group information records an available status of a first unlicensed channel.

Next, step 1003 is executed to enable the first base station to select a first unlicensed channel to communicate with the mobile station according to the first available unlicensed channel group information. Step 1004 is executed to enable the first base station to initialize a communication schedule assessment procedure with the mobile station via the first unlicensed channel. The communication schedule assessment procedure may comprise an LBT procedure to perform channel assessment and measurement.

Step 1005 is executed to enable the first base station to determine that the communication schedule assessment procedure fails (e.g., the LBT assessment result fails) and transmit channel measurement request information to the mobile station through the licensed channel. Step 1006 is executed to enable the mobile station to determine a use status of the unlicensed band according to the channel measurement request information and generate second available unlicensed channel group information.

Thereafter, step 1007 is executed to enable the mobile station to transmit the second available unlicensed channel group information to the first base station. Step 1008 is executed to enable the first base station to select a second unlicensed channel according to the second available unlicensed channel group information. Finally, step 1009 is executed to enable the first base station to reinitialize the communication schedule assessment procedure with the mobile station through the second unlicensed channel.

Figure 11:
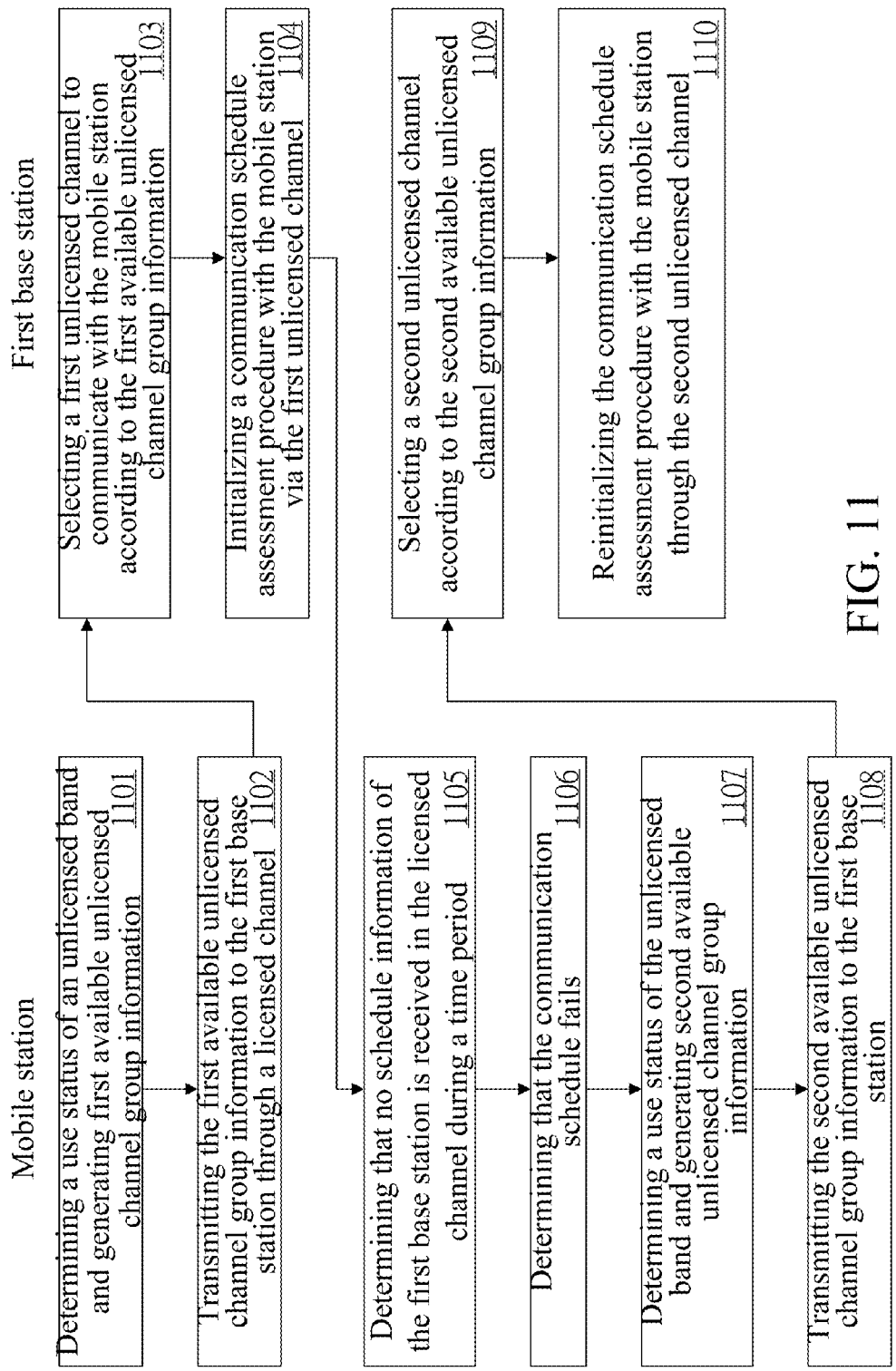
FIG. 11 is a flowchart diagram of a channel access method according to an eleventh embodiment of the present invention.

An eleventh embodiment of the present invention is a channel access method, referring to FIG. 11 for a flowchart diagram of the method. The method of the eleventh embodiment is for use in an LAA network system (e.g., the LAA network system 1 of the aforesaid embodiments) which comprises a mobile station and a first base station. Detailed steps of the eleventh embodiment are as follows.

First, step 1101 is executed to enable the mobile station to determine a use status of an unlicensed band and generate first available unlicensed channel group information. Step 1102 is executed to enable the mobile station to transmit the first available unlicensed channel group information to the first base station through a licensed channel. The first available unlicensed channel group information records an available status of a first unlicensed channel.

Next, step 1103 is executed to enable the first base station to select a first unlicensed channel to communicate with the mobile station according to the first available unlicensed channel group information. Step 1104 is executed to enable the first base station to initialize a communication schedule assessment procedure with the mobile station via the first unlicensed channel. Step 1105 is executed to enable the mobile station to determine that no schedule information of the first base station is received in the licensed channel during a time period.

Thereafter, step 1106 is executed to enable the mobile station to determine that the communication schedule fails according to the result of the step 1105. Step 1107 is executed to enable the mobile station to determine a use status of the unlicensed band according to the result of the step 1106 and generate second available unlicensed channel group information.

Step 1108 is executed to enable the mobile station to transmit the second available unlicensed channel group information to the first base station. Step 1109 is executed to enable the first base station to select a second unlicensed channel according to the second available unlicensed channel group information. Finally, step 1110 is executed to enable the first base station to reinitialize the communication schedule assessment procedure with the mobile station through the second unlicensed channel.

Figure 12:
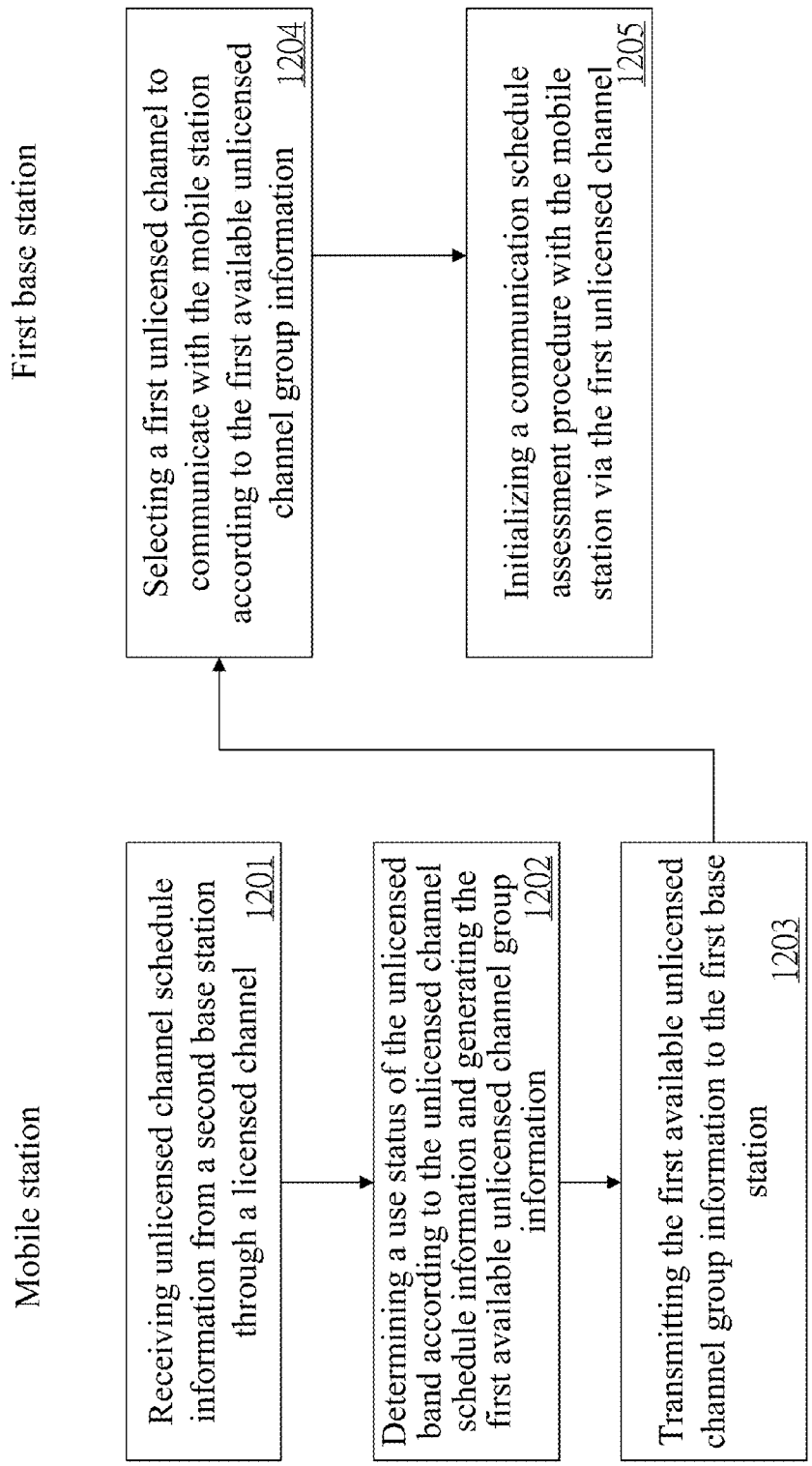
FIG. 12 is a flowchart diagram of a channel access method according to a twelfth embodiment of the present invention.

A twelfth embodiment of the present invention is a channel access method, referring to FIG. 12 for a flowchart diagram of the method. The method of the twelfth embodiment is for use in an LAA network system (e.g., the LAA network system 1 of the aforesaid embodiments) which comprises a mobile station and a first base station. Detailed steps of the twelfth embodiment are as follows.

First, step 1201 is executed to enable the mobile station to receive unlicensed channel schedule information from a second base station through a licensed channel. Step 1202 is executed to enable the mobile station to determine a use status of the unlicensed band according to the unlicensed channel schedule information and generate the first available unlicensed channel group information.

Step 1203 is executed to enable the mobile station to transmit the first available unlicensed channel group information to the first base station. The first available unlicensed channel group information records an available status of a first unlicensed channel. Step 1204 is executed to enable the first base station to select a first unlicensed channel to communicate with the mobile station according to the first available unlicensed channel group information. Finally, step 1205 is executed to enable the first base station to initialize a communication schedule assessment procedure with the mobile station via the first unlicensed channel.

Figure 13:
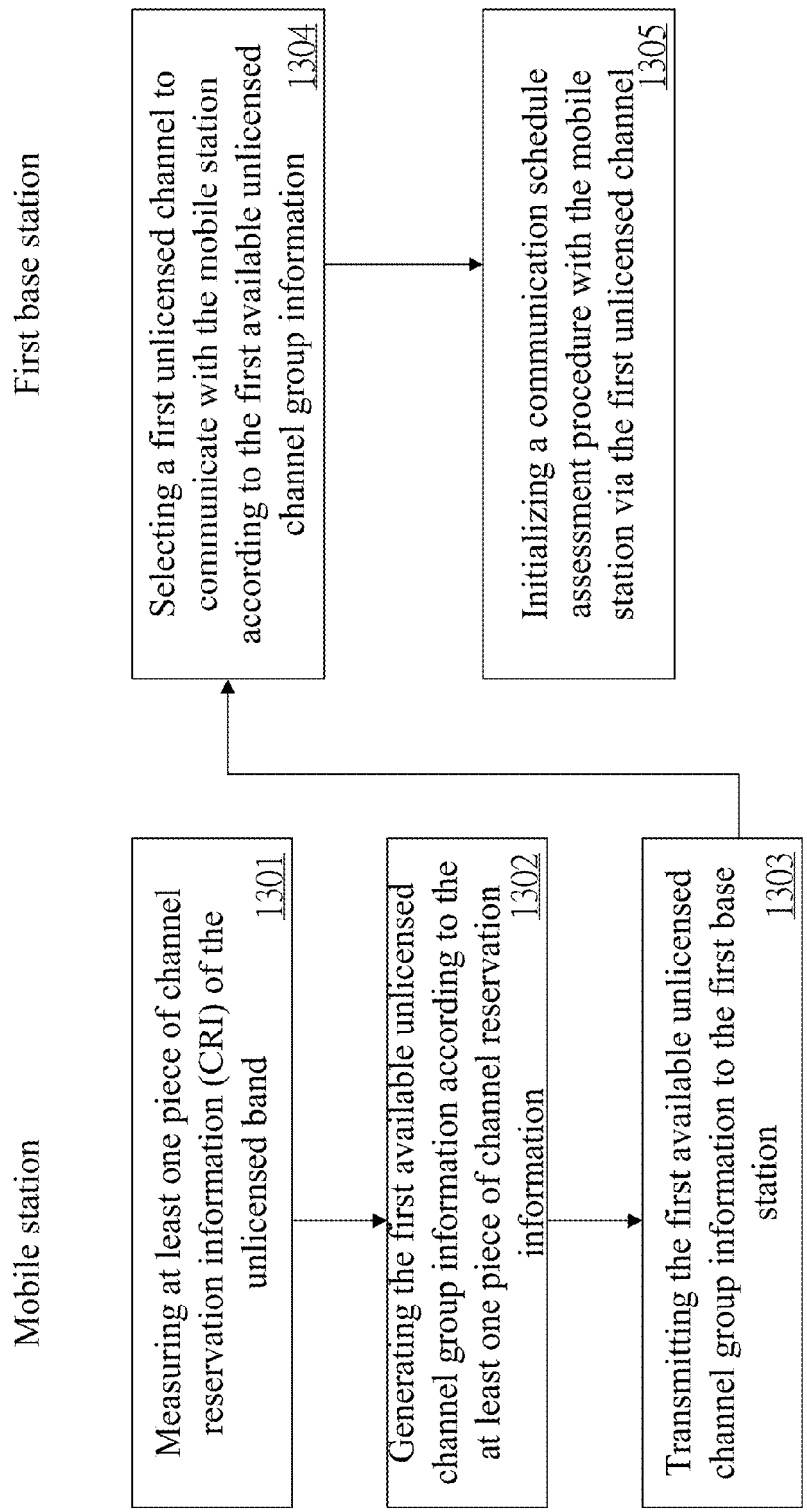
FIG. 13 is a flowchart diagram of a channel access method according to a thirteenth embodiment of the present invention.

A thirteenth embodiment of the present invention is a channel access method, referring to FIG. 13 for a flowchart diagram of the method. The method of the thirteenth embodiment is for use in an LAA network system (e.g., the LAA network system 1 of the aforesaid embodiments) which comprises a mobile station and a first base station. Detailed steps of the thirteenth embodiment are as follows.

First, step 1301 is executed to enable the mobile station to measure at least one piece of channel reservation information (CRI) of the unlicensed band. Step 1302 is executed to enable the mobile station to generate the first available unlicensed channel group information according to the at least one piece of channel reservation information. Step 1303 is executed to enable the mobile station to transmit the first available unlicensed channel group information to the first base station. The first available unlicensed channel group information records an available status of a first unlicensed channel.

Step 1304 is executed to enable the first base station to select a first unlicensed channel to communicate with the mobile station according to the first available unlicensed channel group information. Finally, step 1305 is executed to enable the first base station to initialize a communication schedule assessment procedure with the mobile station via the first unlicensed channel.

Figure 14:
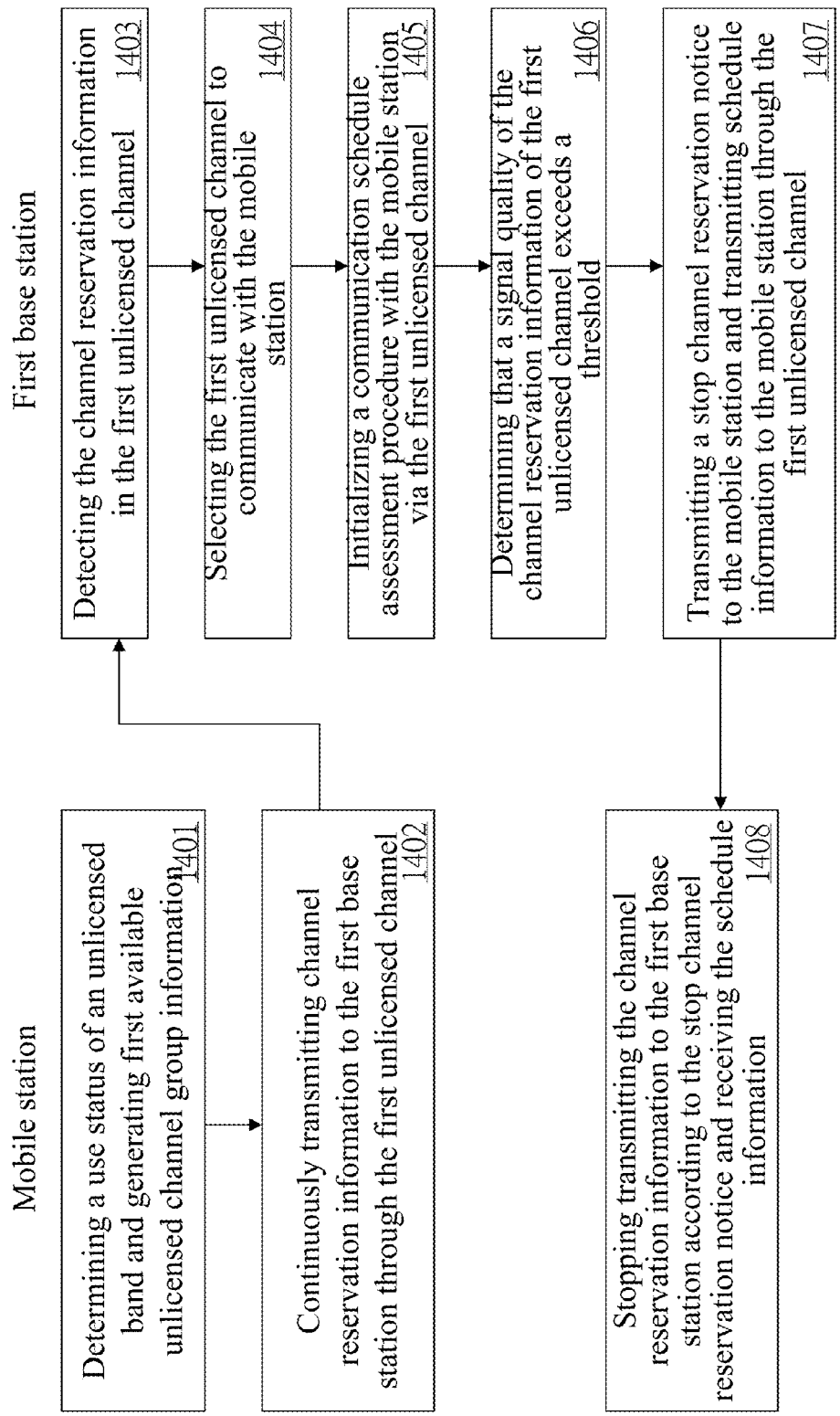
FIG. 14 is a flowchart diagram of a channel access method according to a fourteenth embodiment of the present invention.

A fourteenth embodiment of the present invention is a channel access method, referring to FIG. 14 for a flowchart diagram of the method. The method of the fourteenth embodiment is for use in an LAA network system (e.g., the LAA network system 1 of the aforesaid embodiments) which comprises a mobile station and a first base station. Detailed steps of the fourteenth embodiment are as follows.

First, step 1401 is executed to enable the mobile station to determine a use status of an unlicensed band and generate first available unlicensed channel group information. The first available unlicensed channel group information records an available status of a first unlicensed channel. Step 1402 is executed to enable the mobile station to continuously transmit channel reservation information to the first base station through the first unlicensed channel.

Next, step 1403 is executed to enable the first base station to detect the channel reservation information in the first unlicensed channel. Step 1404 is executed to enable the first base station to select the first unlicensed channel to communicate with the mobile station according to the result of the step 1403. Step 1405 is executed to enable the first base station to initialize a communication schedule assessment procedure with the mobile station via the first unlicensed channel.

Thereafter, step 1406 is executed to enable the first base station to determine that a signal quality of the channel reservation information of the first unlicensed channel exceeds a threshold. Step 1407 is executed to enable the first base station to transmit a stop channel reservation notice to the mobile station and transmit schedule information to the mobile station through the first unlicensed channel according to the result of the step 1406. Finally, step 1408 is executed to enable the mobile station to stop transmitting the channel reservation information to the first base station according to the stop channel reservation notice and receive the schedule information.

Figure 15:
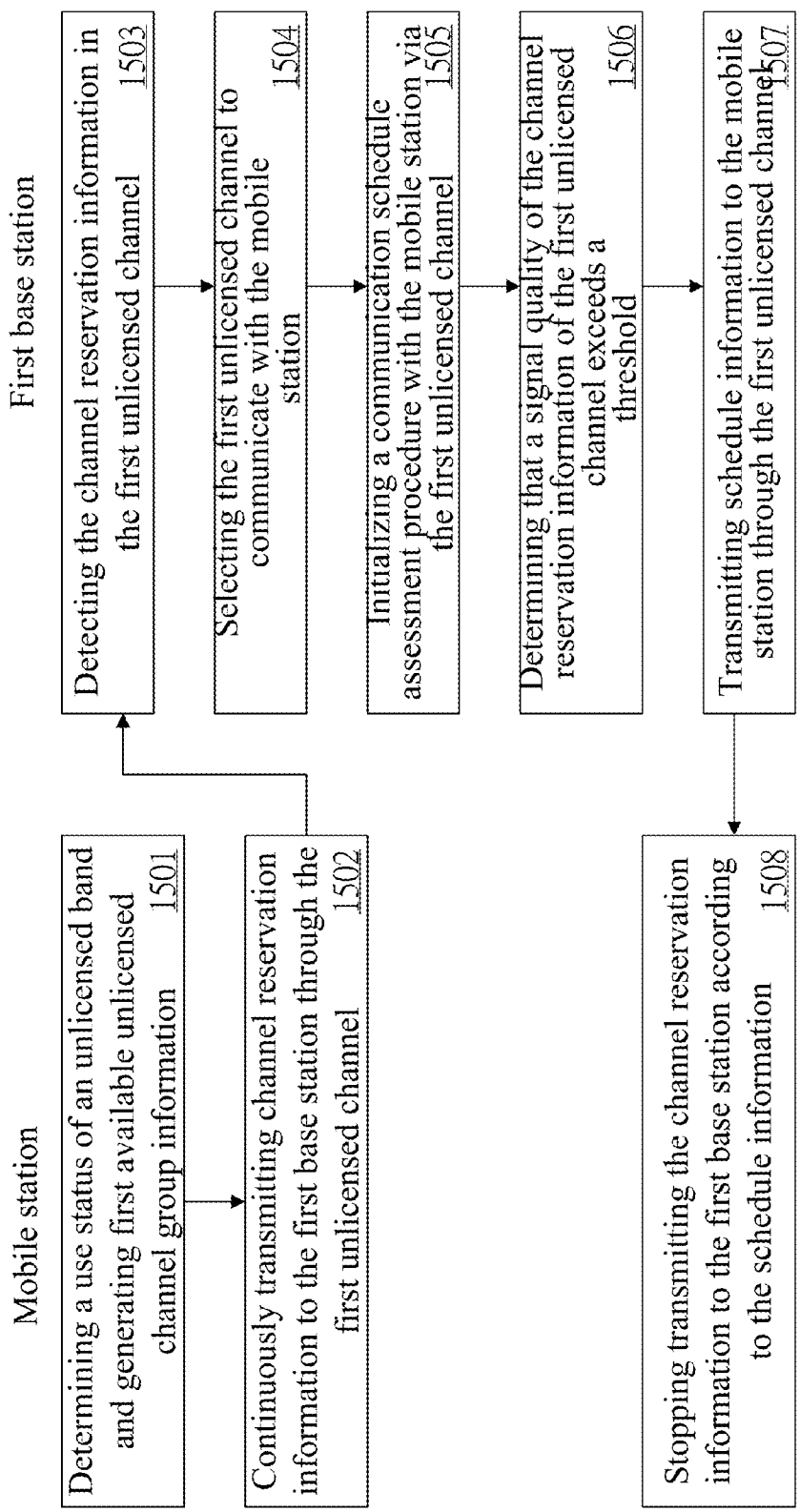
FIG. 15 is a flowchart diagram of a channel access method according to a fifteenth embodiment of the present invention.

A fifteenth embodiment of the present invention is a channel access method, referring to FIG. 15 for a flowchart diagram of the method. The method of the fifteenth embodiment is for use in an LAA network system (e.g., the LAA network system 1 of the aforesaid embodiments) which comprises a mobile station and a first base station. Detailed steps of the fifteenth embodiment are as follows.

First, step 1501 is executed to enable the mobile station to determine a use status of an unlicensed band and generate first available unlicensed channel group information. The first available unlicensed channel group information records an available status of a first unlicensed channel. Step 1502 is executed to enable the mobile station to continuously transmit channel reservation information to the first base station through the first unlicensed channel.

Next, step 1503 is executed to enable the first base station to detect the channel reservation information in the first unlicensed channel. Step 1504 is executed to enable the first base station to select the first unlicensed channel to communicate with the mobile station according to the result of the step 1503. Step 1505 is executed to enable the first base station to initialize a communication schedule assessment procedure with the mobile station via the first unlicensed channel.

Thereafter, step 1506 is executed to enable the first base station to determine that a signal quality of the channel reservation information of the first unlicensed channel exceeds a threshold. Step 1507 is executed to enable the first base station to transmit schedule information to the mobile station through the first unlicensed channel according to the result of the step 1506. Finally, step 1508 is executed to enable the mobile station to stop transmitting the channel reservation information according to the schedule information.

Figure 16:
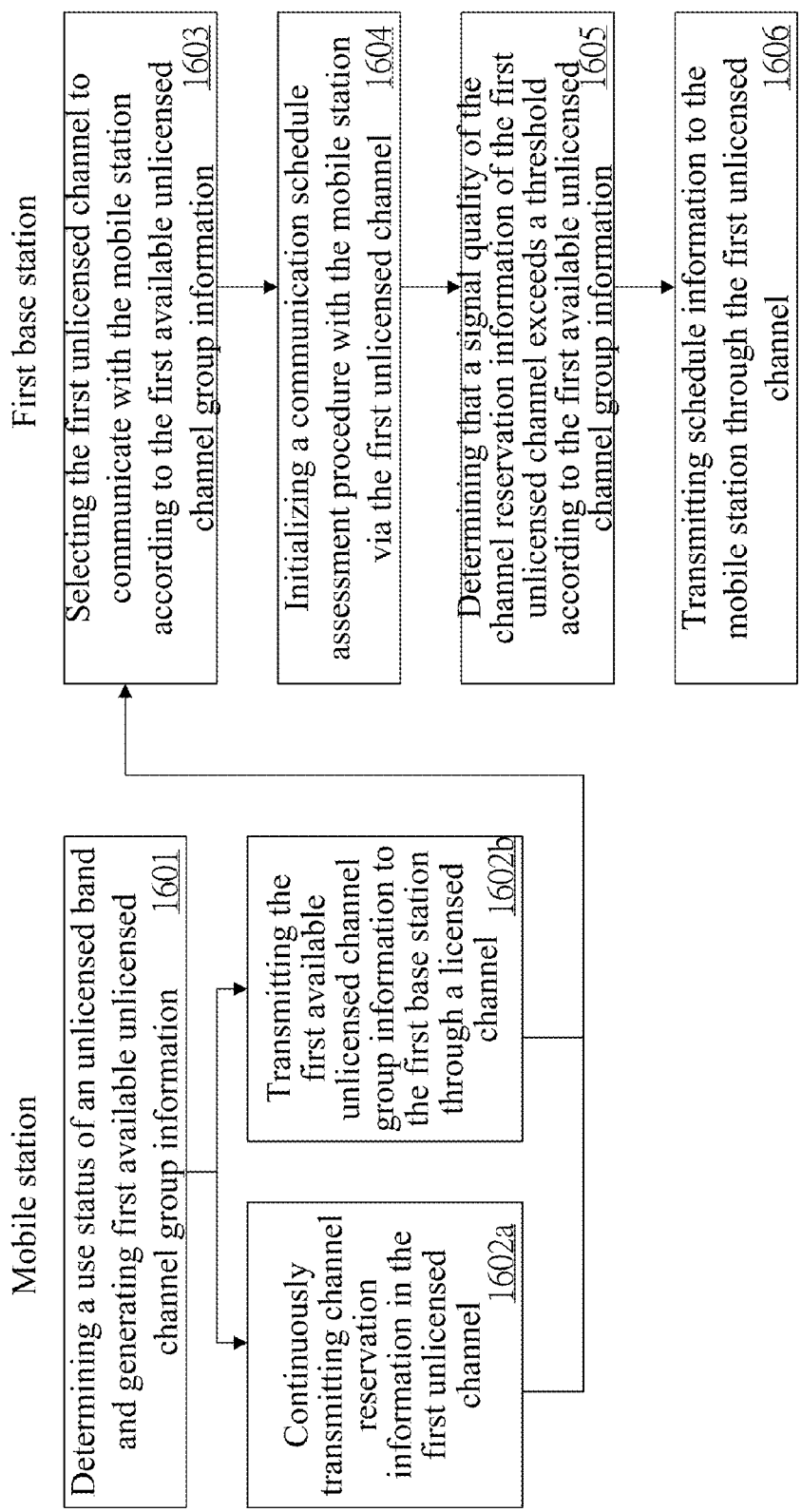
FIG. 16 is a flowchart diagram of a channel access method according to a sixteenth embodiment of the present invention.

A sixteenth embodiment of the present invention is a channel access method, referring to FIG. 16 for a flowchart diagram of the method. The method of the sixteenth embodiment is for use in an LAA network system (e.g., the LAA network system 1 of the aforesaid embodiments) which comprises a mobile station and a first base station. Detailed steps of the sixteenth embodiment are as follows.

First, step 1601 is executed to enable the mobile station to determine a use status of an unlicensed band and generate first available unlicensed channel group information. The first available unlicensed channel group information comprises channel reservation information and records a use status of a first unlicensed channel. Step 1602a is executed to enable the mobile station to continuously transmit channel reservation information in the first unlicensed channel, and this step is mainly configured to preoccupy the available channel and may enable the base station to perform channel assessment of the first unlicensed channel directly using the channel reservation information.

Meanwhile, step 1602b is executed to enable the mobile station to transmit the first available unlicensed channel group information to the first base station through a licensed channel. Next, step 1603 is executed to enable the first base station to select the first unlicensed channel to communicate with the mobile station according to the first available unlicensed channel group information. Step 1604 is executed to enable the first base station to initialize a communication schedule assessment procedure with the mobile station via the first unlicensed channel.

Thereafter, step 1605 is executed to enable the first base station to determine that a signal quality of the channel reservation information of the first unlicensed channel exceeds a threshold according to the first available unlicensed channel group information. Finally, step 1606 is executed to enable the first base station to transmit schedule information to the mobile station through the first unlicensed channel according to the result of the step 1605.

According to the above descriptions, in the channel access method for use in an LAA network system of the present invention, the unlicensed channel is mainly determined by the mobile station, and the determination result is reported to the base station through the unlicensed channel/the licensed channel so that the base station can more clearly learn the channel use demand of each mobile station to improve the network resource utilization ratio and meanwhile reduce the load of the base station.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile station for a licensed assisted access (LAA) network system, the LAA network system further comprising a first base station, and the mobile station comprising:
   a transceiver; and
   a processor;
   wherein:
   the processor determines a use status of an unlicensed band via the transceiver and generates first available unlicensed channel group information;
   the transceiver transmits the first available unlicensed channel group information to the first base station so that the first base station selects a first unlicensed channel according to the first available unlicensed channel group information;

the processor initializes a communication schedule assessment procedure with the first base station through the first unlicensed channel and via the transceiver;

the processor determines that the communication schedule assessment procedure fails;

the processor determines a use status of the unlicensed band via the transceiver according to the determination result that the communication schedule assessment procedure fails, and generates second available unlicensed channel group information;

the transceiver transmits the second available unlicensed channel group information to the first base station so that the first base station selects a second unlicensed channel according to the second available unlicensed channel group information; and the processor initializes the communication schedule assessment procedure with the first base station through the second unlicensed channel and via the transceiver.

2. The mobile station of claim 1, wherein:

after the first base station asseses that the second unlicensed channel is available and determine that the communication schedule assessment procedure succeeds, the processor receives schedule information from the first base station through the second unlicensed channel and via the transceiver.

3. The mobile station of claim 1, wherein:

the transceiver transmits the first available unlicensed channel group information to the first base station through a licensed channel so that the first base station selects the first unlicensed channel according to the first available unlicensed channel group information.

4. The mobile station of claim 3, wherein:

after determining that the communication schedule assessment procedure fails, the processor receives channel measurement request information from the first base station through the licensed channel and via the transceiver;

the processor determines the use status of the unlicensed band according to the channel measurement request information and generates the second available unlicensed channel group information.

5. The mobile station of claim 3, wherein:

the processor determines that schedule information of the first base station is not received in the licensed channel during a time period; and the processor determines that the communication schedule assessment procedure fails according to the determination of that the schedule information of the first base station is not received in the licensed channel during the time period.

6. The mobile station of claim 1, wherein:

the transceiver receives unlicensed channel schedule information from a second base station through a licensed channel; and the processor determines the use status of the unlicensed band according to the unlicensed channel schedule information and generates the first available unlicensed channel group information.

7. The mobile station of claim 1, wherein:

the transceiver receives at least one piece of channel reservation information (CRI) of the unlicensed band; and the processor generates the first available unlicensed channel group information according to the at least one piece of channel reservation information.

8. The mobile station of claim 1, wherein the second available unlicensed channel group information comprises channel reservation information, and:

the transceiver continuously transmits the channel reservation information to the second base station through the first unlicensed channel so that the first base station selects the second unlicensed channel according to the second available unlicensed channel group information.

9. The mobile station of claim 8, wherein the channel reservation information is one of a channel reservation signal sequence and a channel reservation message packet, and:

the transceiver receives a stop channel reservation notice from the first base station;

the processor stops transmitting the channel reservation information via the transceiver to the first base station according to the stop channel reservation notice; and the processor receives schedule information from the first base station through the second unlicensed channel and via the transceiver.

10. The mobile station of claim 8, wherein the channel reservation information is one of a channel reservation signal sequence and a channel reservation message packet, and:

the transceiver receives schedule information from the first base station through the second unlicensed channel; and the processor stops transmitting the channel reservation information via the transceiver according to the schedule information.

11. The mobile station of claim 1, wherein the second available unlicensed channel group information comprises channel reservation information, and:

the transceiver continuously transmits the channel reservation information in the second unlicensed channel;

the transceiver transmits the second available unlicensed channel group information to the first bases station through a licensed channel; and the transceiver receives schedule information from the first base station through the second unlicensed channel.

* * * * *